US007233957B1

(12) United States Patent
Sheehy, Jr. et al.

(10) Patent No.: US 7,233,957 B1
(45) Date of Patent: Jun. 19, 2007

(54) METHOD AND APPARATUS FOR IDENTIFYING AND PROCESSING CHANGES TO MANAGEMENT INFORMATION

(75) Inventors: John P. Sheehy, Jr., Braintree, MA (US); Evgeny Roytman, Sharon, MA (US); Thomas DeMay, Ashburn, VA (US); Anoop George Ninan, Milford, MA (US); Boris Farizon, Westborough, MA (US); Valery Altman, Newton, MA (US); Gregory MacKinnon, Somerville, MA (US)

(73) Assignee: EMC Corporation, Hopkinton, MA (US)

( * ) Notice: Subject to any disclaimer, the term of this patent is extended or adjusted under 35 U.S.C. 154(b) by 396 days.

(21) Appl. No.: 10/675,205

(22) Filed: Sep. 30, 2003

(51) Int. Cl.
*G06F 17/30* (2006.01)
(52) U.S. Cl. .................................................. 707/102
(58) Field of Classification Search ............. 707/1–10, 707/100–104.1, 200–206
See application file for complete search history.

(56) References Cited

U.S. PATENT DOCUMENTS

2005/0099974 A1* 5/2005 Kats et al. .................. 370/328
2005/0144411 A1* 6/2005 Meng ......................... 711/170

* cited by examiner

*Primary Examiner*—Diane D. Mizrahi
(74) *Attorney, Agent, or Firm*—Chapin IP Law, LLC; Barry W. Chapin, Esq.

(57) ABSTRACT

Mechanisms and techniques for processing information in a network management application, such as a storage area network management application, include an agent and store process. The agent collects a current management data set from managed entity(s) in a network and compares the current management data set to a former management data set previously collected from the managed entity to identify differences in the current management data set as compared to the former management data set. The agent transmits the current management data set to a store process. The store process receives the current management data set and uses verification values and change indicators contained therein to identifying current portions of management data in the current management data that reflect a change. For any changed data portions, the store process modifies or updates managed object data in the management database.

41 Claims, 10 Drawing Sheets

AGENT PROCESSING

STORE PROCESSING

STORAGE PROCESS PROCESSING

METHOD AND APPARATUS FOR IDENTIFYING AND PROCESSING CHANGES TO MANAGEMENT INFORMATION

FIELD OF THE INVENTION

The present invention generally relates to computer and software systems that operate to manage managed entities, and more particularly, to systems and techniques that allow for processing of managed entity data.

BACKGROUND

The rapid expansion of information service and data processing industries has resulted in a need for computer systems to manage and store large amounts of data. As an example, financial service industry businesses such as banks, mutual fund companies or the like often operate large and complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems that operate as servers to access data stored in the data storage systems. Elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

A developer or administrator of such a storage area network environment may install one or more distributed storage area network management software applications within the storage area network to manage or administer the various elements (i.e., devices, computer systems, storage systems, etc.) that operate within the storage area network. A network manager (i.e., a person) responsible for management of the storage area network operates the network management software application to perform management tasks such as performance monitoring, network analysis and remote configuration and administration of the various components operating within the storage area network.

A typical conventional storage area network management software application may have several different software components that execute independently of each other on different computer systems but that collectively interoperate together to perform network management. As an example, conventional designs of storage area network management applications can include console component, a server component, several agent components, storage components and possibly other software components.

Generally, the server component operates as a central control process within the storage area network management application and coordinates communication between the console, storage and agent components. The console component often executes within a dedicated storage area network management workstation to allow the network administrator to visualize and remotely control and manage the various elements within the storage area network that are graphically represented within the console. Agent components execute on various host computer systems such as servers within the storage area network to manage storage area network entities (i.e., managed entities or elements). As an example, there may be different respective agents specifically designed (e.g., coded) to remotely manage and control certain vendor-specific data storage systems, databases, switches, and so forth. Agent components receive remote management commands from the server component and apply functionality associated with those management commands to the managed entities within the storage area network for which those agents are designated to manage. Agents are also responsible for periodically collecting configuration or management data concerning the storage area network elements that those agents managed. Agents transmit this collected management data back to a storage component. The storage component receives the collected management data from the agents and processes and stores this information into a storage area network management database for access by the server component. The console component can interact with the server component and the network management database to obtain current connectivity and statistical information, such as performance, capacity, load or other data, concerning managed entities within the storage area network.

SUMMARY

Conventional mechanisms and techniques for managing the collection and processing of management data for managed entities within network management applications suffer from a variety of deficiencies. In particular, the design of conventional network management applications often uses a large number of agent components that each remotely operate to periodically collect sets of management data concerning the managed entities that those agents manage. After collection, each agent is responsible for transmitting the collected set of management and configuration data to the store process that processes the management data for storage into a management database or other accessible management data repository. Depending upon the size and complexity of the network, the processing tasks involved with collecting and processing management data from many agents by store processes that store this data within the centralized network management database can consume significant processing resources. No mechanism exists in conventional management applications to greatly reduce this burden.

Specifically, in conventional network management application implementations, for a particular managed entity (e.g., a data storage system or a data switch), the agent responsible to interacting with that managed entity collects and forwards management data associated with that data storage system to the storage component for placement into the management database. The storage component receives the entire set of collected management data and convert each field of this data from one data type or arrangement to another (e.g., converts string data to object data) and then places this data into the network management database. This post-processing operation of management data can involve parsing, converting and mapping the entire set of collected management data (e.g., converting each data portion from a character string data or field delimited data to object data) for placement into data structures such as objects corresponding to the managed entities in the storage area network. Little effort is undertaken in conventional management application system designs to reduce the amount of data to be processed in this manner.

Conventional systems do not undertake or perform processing to identify only data that must be processed for placement into the management database. Such data may include, for example, only data that has changed since the last collection period or interval. Instead, conventional management applications operate agents that simply collect the entire set of management data for an entity and transfer this entire set to the store process. The store process receives this and converts the entire set of collected data (i.e., each field) into management data structures that are then stored into the management database. One problem with such a system design is that the processing burden associated with placement of management data into the management database can become quite significant so as to have a negative effect on throughput of the storage component. This conventional design of processing and storing the entire set of collected management data can substantially impair performance of the overall storage management application.

In some conventional implementations, the storage component of the network management application can queue up management data transactions received from agents during busy time periods when many agents transmit large amounts of management data to the store process for placement into the management database. Agent transactions may be queued for significant amounts of time thus resulting in processing delays with respect to population of the storage area network management database with the most current management data collected from agents. Delays in processing management data can impact accurate reporting of the current state of managed entities in the storage area network management application. As such, it would be beneficial to reduce the processing requirements for collection and transmission of management data from agents to store processes. In addition, it would be beneficial to reduce or limit the amount of data that the store process must process for conversion into management data for storage within the management database.

Embodiments of the invention operate to significantly overcome these and other deficiencies associated with conventional mechanisms and techniques for processing of management data in a network management application. In particular, embodiments of the invention provide mechanisms and technique that enable an agent to collect management data from one or more managed entities as a current set of management data. Since a typical agent is responsible for interacting with those managed entities for extended periods of time, once the agent has collected the current set of management data, the agent can compare data information in this current or most recently collected set of management data with a former management data set to identify changes or differences in the two sets of management data collected from the same managed entity(s). The agent identifies these differences, such as the addition of new data fields, the deletion of former data fields, and the modification or change to a value of an existing field between the current and former management data sets. The agent can use verification values such as checksums, hash values or the like to identify changes between the current and former data sets. The agent then can transmit the current management data set that now includes the identified differences to a store process that can use this information to update a management database that stores the most up-to-date management data concerning operation of the managed entities in the network.

The store process of embodiments of this invention receives a current management data set from the agent and can verify the accurate receipt of its contents. The store process can use verification values such as former checksums (one contained in the current data set received from the agent and the other formerly saved by the store process) to determine if the agent that sent the current management data set calculated the change set based on the same data as had previously been sent to the store for those managed entities. If it is the same agent, then the store process can update managed entity data (e.g., managed object data) in the management database using the change indicator information for each data portion in the current management data set received from the agent. The store process updates managed object data with current data portions having a change indictor indicating the field was changed, adds managed object data for data portions indicated as being new, and deletes managed object data for data portions identified as being deleted. The store process need not consider fields or data portions that are unchanged or that remain the same in value between the current and former management data sets. Since that is often large amounts of network management information that does not frequently change within managed entities in a networked environment such as a storage area network, the store process configured according to embodiments of the invention is able to significantly reduce processing requirements to populate the management database with updates received from agents since the store process does not have to convert data portions that did not change in value since the last management data set (i.e., the former set) was received by that store process.

Only in cases where the former and current checksums of the management data set do not match does the store process need to perform a complete or full update or replacement of all managed object data with the entire current management data set (for those managed objects that correspond to this data). However, since agents typically operate for extended periods of time, embodiments of this invention greatly reduce the amount of time a store process must spend processing changes to management data to keep the management database up-to-date.

More specifically, an agent application or process configured according to embodiments of the invention is capable of processing management data by performing operations including collecting a current management data set from at least one managed entity in a network. The agent then compares the current management data set to a former management data set previously collected from the managed entity in the network to identify differences in the current management data set as compared to the former management data set. Once this process is complete (as will be explained in detail herein), the agent appends at least one verification value to the current management data set to allow remote verification of contents of the current management data set and transmits the current management data set to a remote store process for storage within a management database for access by a network management application.

A store process processing the management data by receiving a current management data set (i.e., from an agent) containing current portions of management data collected from at least one managed entity in a network. The current management data set includes at least one verification value such as checksum information. Using the verification values, the store process identifies current portions of management data in the current management data set that reflect a change as compared to management data in managed objects obtained from a former management data set previously collected from the managed entity and stored within a management database. For any current portions of management data in the current management data that reflect a change in comparison to management data in managed objects in the management database, the store process modifies the managed object data in the management database with portions of management data from the current management data set to reflect any identified differences from the current management data set. In this manner, the store process can identify and does not have to process data portions that have not changed between the current and former collections of management data received from an agent.

Other embodiments of the invention include computerized devices, such as host and storage system computer systems, workstations or other computerized devices configured to process all of the method operations disclosed herein as embodiments of the invention for both the agent and store processes. In such embodiments, a computerized device includes a memory system, a processor, a communications interface and an interconnection mechanism connecting these components. The memory system is encoded with either an agent application (if the host computer) or a storage application (if the storage computer system) that when performed on the processor, produces an agent process (or store process) that operate as explained herein within the respective host or storage system computerized devices to perform all of the method embodiments and operations explained herein as embodiments of the invention.

Other arrangements of embodiments of the invention that are disclosed herein include software programs to perform the method embodiment steps and operations summarized above and disclosed in detail below for both the agent and/or the store process. More particularly, a computer program product is disclosed that has a computer-readable medium including computer program logic encoded thereon that when performed in a computerized device provides associated operations of the agent, or the store process, each as respectively explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of storage area network management servers, hosts or other entities can also provide the system of the invention. The system of the invention can be distributed between many software processes on several computers, or all processes such as the agent and store process could execute on a small set of dedicated computers, or on one computer alone. Though preferred embodiments provide the agent and store process execute on separate computer systems, the particular distribution of the agent and store process is not intended to be limiting.

It is to be understood that the system of the invention can be embodied strictly as a software program, as software and hardware, or as hardware alone. Example embodiments of the invention may be implemented within EMC's Control Center software application that provides management functionality for storage area network resources and in computerized devices that operate the Control Center software. Control Center is manufactured by EMC Corporation of Hopkinton, Mass., USA.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
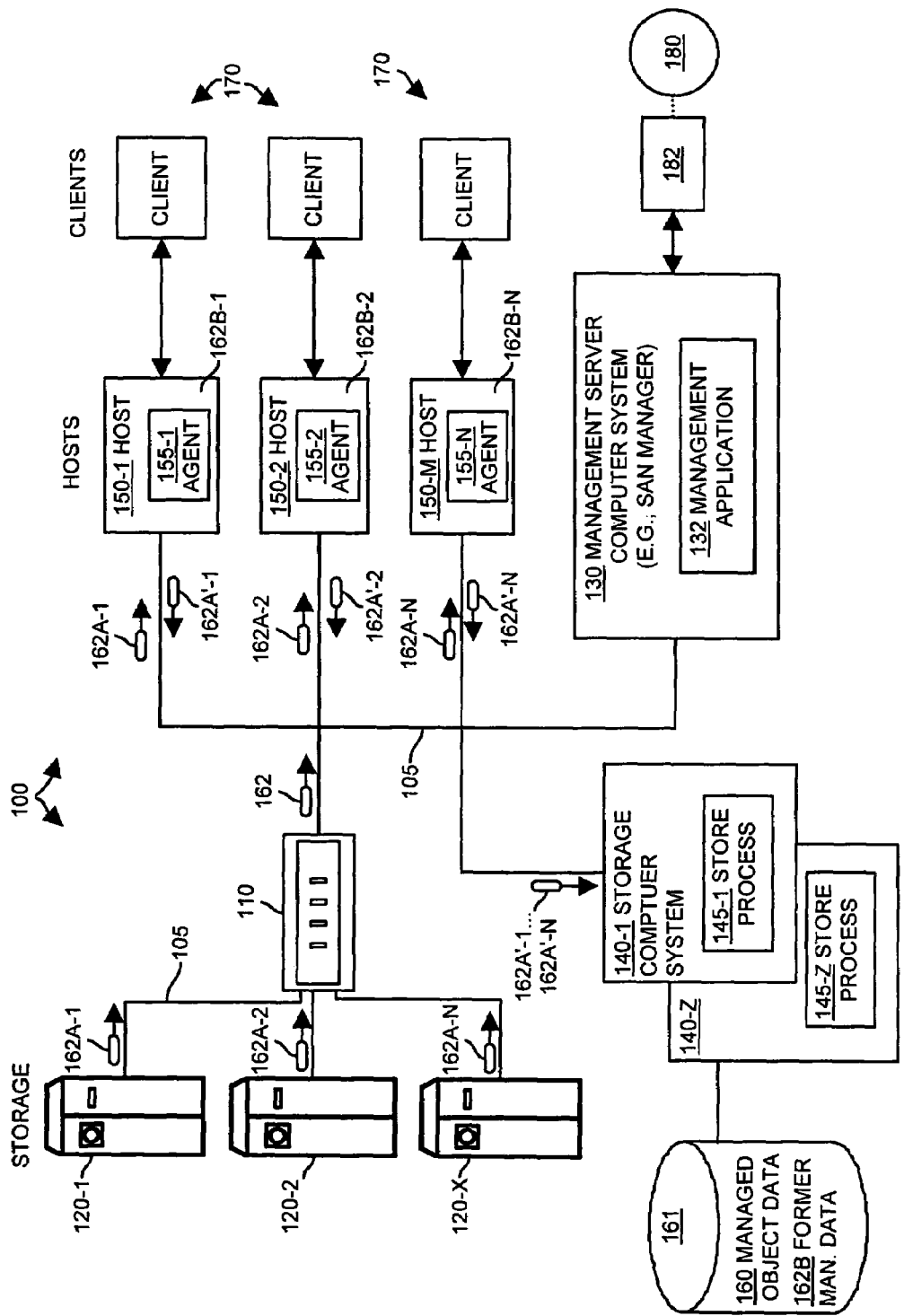
FIG. 1 illustrates an example storage area network and computing system environment including agent and store processes configured to operate according to embodiments of the invention.

Generally, embodiments of the invention provide mechanisms and techniques for processing management data for use, for example, within a computer system or network management application. In particular, network management applications such as those used in management of storage area networks, for example, operate agent processes and store processes configured according to embodiments of the invention that allow the network management application to perform periodic collection of data concerning managed entities under the control or management of the network management application. The agents perform the data collection of management data from managed entities and transfer the collected management data to store processes for placement into a management database or other repository for access by the network management application in order to allow a network administrator operating the network management application to be able to manage the managed entities to which the agents are assigned. The agent processes of this invention are assigned to collect management data for specific managed entities and during, or shortly after this collection process, the agents are capable of identifying changes in a current or most recently collected management data set in comparison with a former management data set previously collected from the managed entities by that agent. In other words, the agents are capable of identifying changes between the currently collected management data and formally collected management data. The agents of this invention can transfer the collected current management data set including an identification of changes between data contained therein and the formally collected management data set to a store process for processing into the management database.

A store process configured in accordance with embodiments of the invention can receive a current management data set from an agent and can use the change indications produced by the agent in order to store the most up-to-date version of the management data within the management database under control of the store process. This processing can include using the change information contained within the currently received management data set to identify updates (additions, deletions, and modifications) to be made to management data contained within managed objects in the management database. By being able to identify changes between the most recent or current management data set and formerly collected management data in a former management data set (i.e., as identified by the agents that collected such data), embodiments of the invention reduced the overall processing required by the store process in order to store the most up-to-date management data. This is because the store process does not necessarily have to access and store the entire set of current management data received from an agent. Rather, according to embodiments of the invention, the store process only needs to access and update portions of management data in the management database with current portions of management data identified within the current management data set that are indicated as containing the change or difference as compared with the formerly collected management data set. As an example, if an agent collects a current management data set that only contains a few changes to management data, upon receipt of this current management data set by the store process, the store process according to embodiments of the invention only needs to access and update a small number of managed data portions in the management database that relate to the changed portions of management data as reflected by the change indications within the current management data set received from agent. This significantly conserves processing resources (e.g., CPU and memory utilization) within storage computer systems execute store processes.

FIG. 1 illustrates an example of a networking environment suitable for use in explaining example embodiments of the invention. In this example, the networking environment is a storage area network 100 that includes a communications medium 105 that interconnects a plurality of data storage systems 120-1 through 120-X through one or more connectivity devices 110 (e.g., storage area network switches) to a plurality of host computer systems 150-1 through 150-M. According to the general operation of the storage area network shown in FIG. 1, client computer systems 170 can operate various client software applications (not specifically shown) that communicate with server applications (not specifically shown) operating within the host computer systems 150 in order to access data stored within the data storage systems 120 over the storage area network 100.

Figure 2:
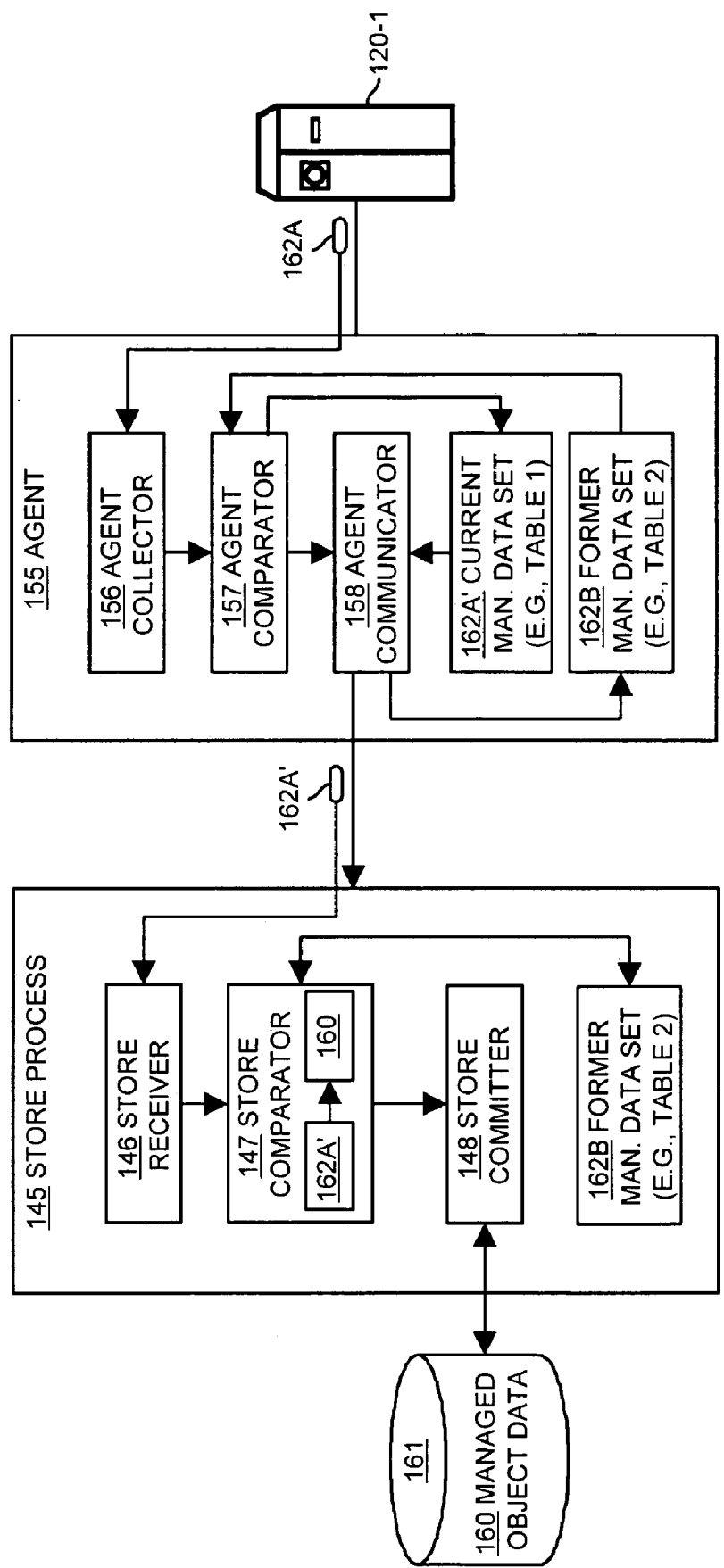
FIG. 2 illustrates an example architecture of agent and store processes configured to operate according to embodiments of the invention.

Also illustrated in this example storage area network 100 is a management server computer system 130 that operates a network management application 132. In addition, the storage area network 100 includes one or more storage computer systems 140-1 through 140-Z that operate respective store processes 145-1 through 145-Z configured in accordance with embodiments of the invention. A plurality of agent software processes 155-1 through 155-N operate within one or more of the host computer systems 150-1 through 150-M as further defined by embodiments of the invention. Generally, the agents 155 and store processes 145 interoperate with, and are collectively considered parts of the management application 132. A network administrator 180 interacts via a console computer system 182 with the management application 132 executing on the management server computer system 130 in order to remotely administer manageable A entities within the storage area network 100 such as the data storage systems 120, the connectivity devices 110 and the host computer systems 150. Embodiments of the invention generally relate to the processing perform by and between the agents 155 and the store processes 145 to collect management data 162 from managed entities (e.g., 120 and/or 110 and others not specifically shown) for placement into the management database 160 for access by the management application 132. FIG. 2 illustrates a more detailed view of processing performed according to embodiments of invention between agents 155 and store processes 145.

FIG. 2 illustrates an example configuration of an agent 155 and a store process 145 in accordance with one example embodiment of the invention. The example in FIG. 2 illustrates a single agent 155 interacting with a single store process 145 operating a storage computer system 140. The agent 155 includes, in this example, a number of software components including an agent collector 156, an agent comparator 157, and an agent communicator 158. The store process 145 includes, in this example, a store receiver 146, a store comparator 147 and a store committer 148. The store process 145) interfaces with a management database 161 and maintains managed objects 160 (i.e., managed object data). Also in this example, the agent 155 operates to manage a managed entity 120-1 that in this example is a data storage system. It is to be understood that embodiments of the invention are not limited to collecting management data from only data storage systems, but rather are applicable to any type of agent 155 collecting management data 162A from any type of managed entity. The example configuration illustrated in FIG. 2 will be used to provide an overview of operations of embodiments of the invention to be followed by a more detailed explanation of processing operations thereafter.

Figure 3:
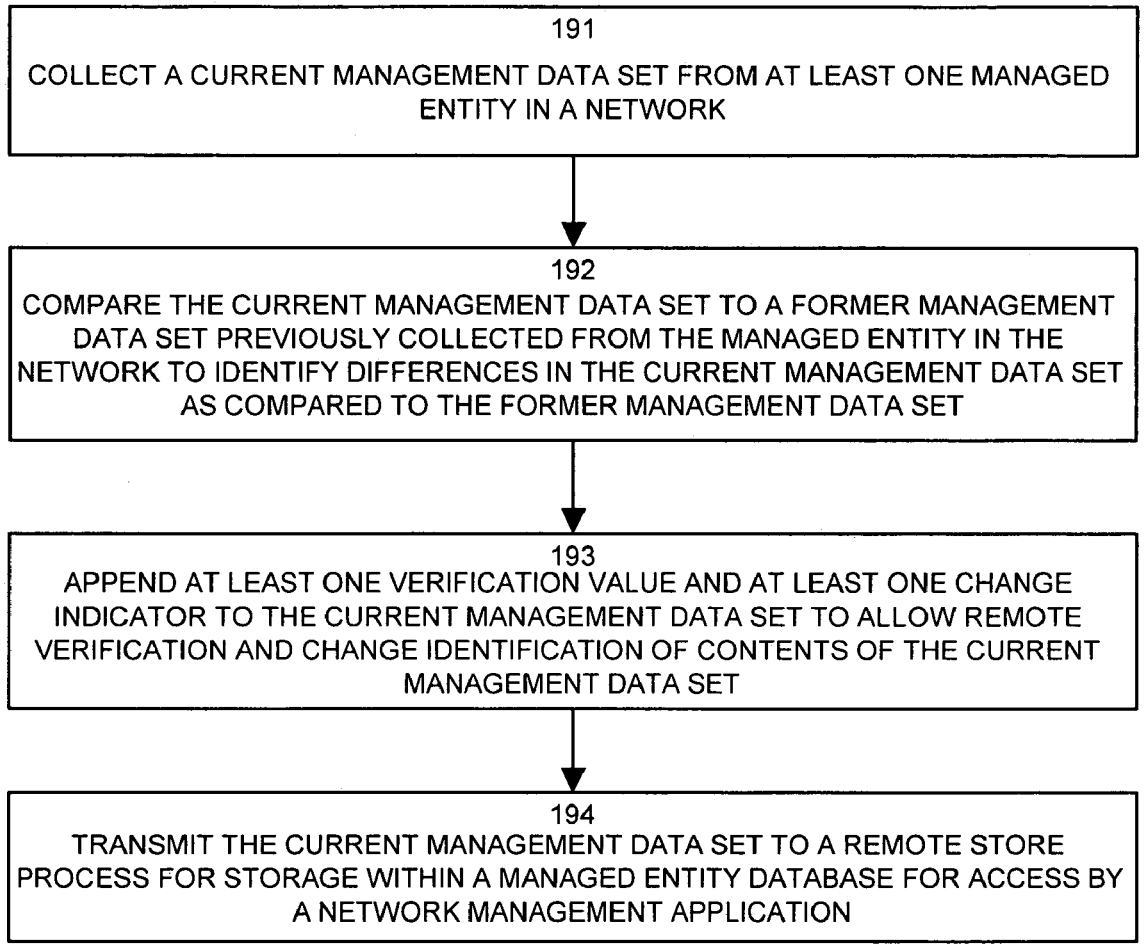
FIG. 3 is a flow chart of processing steps that show the general operation of an agent process configured to process management information according to embodiments of the invention.

FIG. 3 is a flow chart of high level processing operations performed by an agent 155 in accordance with one example embodiment of the invention.

In step 191, according to the general operation of embodiments of the invention, the agent 155 operates to periodically collect management data 162A from the managed entity 120 associated to the agent 155. As shown in this example in FIG. 2, the agent 155 is responsible for performing management functionality associated with the data storage system 120, and thus the agent collector 156 in the agent 155 periodically queries or otherwise interacts with the data storage system 120 in order to collect management data 162A that contains information concerning the performance, configuration and/or other operational characteristics associated with the data storage system 120. It is to be understood that embodiments of the invention allow an agent 155 to collect a set of management data 162A for more than one managed entity 120 assigned to that agent 155 even though only one managed entity is shown in this example.

In step 192, generally, and as will be explained in more detail shortly, the agent 155 is operable to compare a collected current management data set 162A to a formerly collected management data set 162B (i.e., management data previously collected by the agent 155 from the same managed entity) to identify differences or changes between the current management data set 162A and the formerly collected management data set 162B. The agent 155 caches or otherwise temporarily stores the most recent formerly collected management data set 162B for this purpose (e.g., in memory or in a local storage device).

In step 193, the agent appends (e.g., inserts) verification value(s) and change indications to the current management data set 162A. In particular, during the comparison of a current (i.e., most recently collected) management data set 162A to a former management data set 162B, the agent comparator 157 can mark or otherwise provide an indication of which current portions of management data (in the set 162A) differ from former portions of management data in the formerly collected set of management data 162B. The portions of data in data sets 162A and 162B that an agent 155 compares for changes in this manner may be, for example, fields in field delimited data, rows in one or more tabular data structures, records or fields, object oriented data fields in objects, or the like. Any suitable data structures can be used for the collection and comparison of data 162 in steps 191 and 192. The agent 155 detects changes in the management data 162 (between the new data 162A and the old data 162B) including additions of new fields or values of data, deletions of fields or values of data, and modifications to values of existing fields of data as compared to their former values. The agent can use formerly computed verification values in comparison with current computed verification values, such as checksums, for this purpose, as will be explained.

The agent comparator 157 provides indications either within or associated with the current management data set 162A that indicate this change information (i.e., that indicates all changes between the current and former management data sets 162A and 162B) to produce the current management data set 162A'. Thus, the current management data set 162A' in FIG. 2 represents the current collected management data 162A in addition to identifications of changes between this data (162A) and the formerly collected management data set 162B. The current management data set 162A' also includes the verification values (e.g., checksums) of the data. Accordingly, when the agent 155 has completed this comparison process (between 162A and 162B data sets), the agent 155 produces the current management data set 162A' (i.e., 162A-prime) that includes the current collected management data 162A along with verification values and indications of changes between fields or data portions in this set in comparison to the former set 162B.

In step 194, the agent 155, via operation of the agent communicator 158, transmits the current set of management data 162A' to the store process 145 to which the agent 155 is assigned. The store process 145 processes the current set of management data 162A' and upon completion, forwards an acknowledgement 167 from the store process 145 that is received by the agent 155. In response to the acknowledgement 167, the agent communicator 158 also stores the current management data set 162A' as the former management data set 162B. In other words, the current management data set 162A' becomes the next former management data set 162B for use by that agent 155 during the next collection process of management data from the managed entity(s) assigned to that agent 155 briefly explained above. Further details of agent processing according to other embodiments of the invention will be explained shortly.

Figure 4:
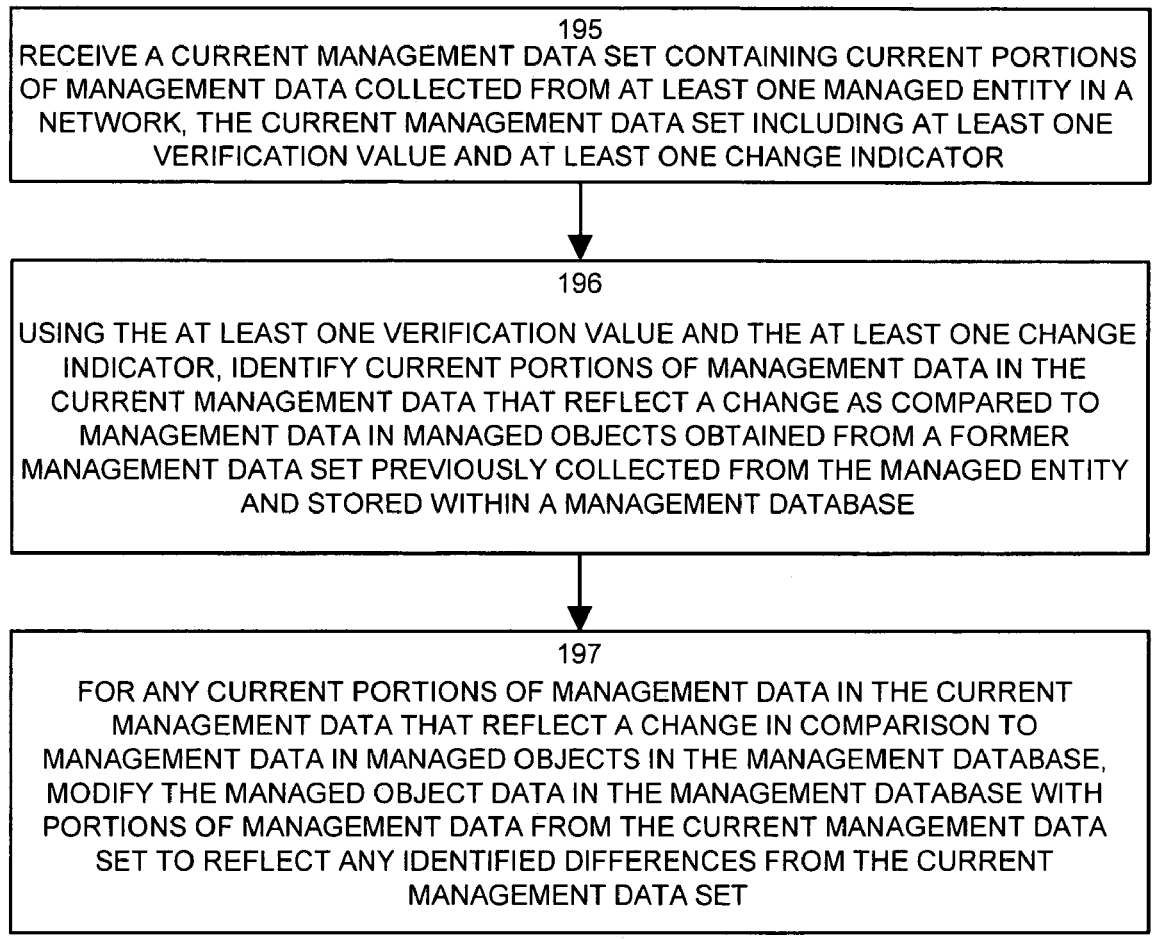
FIG. 4 is a flow chart of processing steps that show the general operation of a store process configured to process management information according to embodiments of the invention.

FIG. 4 is a flow chart of processing steps that show the high-level processing operations that a store process 145 performs in accordance with embodiments of the invention.

In step 195, the store process 145 operates the store receiver 146 to receive the current set of management data 162A' containing current portions of management data collected at least one managed entity 120 in a network (e.g., 100 in FIG. 1). The current set of management data 162A' includes at least one verification value and at least one change indicator identifying changes in the current set of management data 162A' in comparison to a former set of management data 162B.

In step 196, the agent 155 operates the store comparator 147 to process that received current management data set 162A' to identify, using the verification values and change indicators, current portions of management data in the current management data set 162A' that reflect a change as compared to management data in managed objects 160 obtained from a former set of management data 162B previously collected from the managed entity 120 and stored within the management database 161. The store process 145 as explained herein can thus identify fields or data portions that the agent 155 indicated as being changed in comparison to the former management data set 162B'.

In step 197, the store process 145 operates the store committer 148 to store any current portions of the received current management data set 162A' that reflect or are indicated as being changed in comparison to managed objects 160 in the management database 161 into the management database 161. This processing can involve modifying the managed object data in the managed object database 161 with portions of management data from the current managed data set 162A' to reflect any identified differences. For those data portions that are different, the store comparator 147 can convert data within the current management data set into managed object data 160. In addition, the store committer 148 stores at least a portion of the newly received current management data set 162A' as a former management data set 162B' for use on a successive generations of this processing. As an example, in one embodiment, the store process only saves a subset of the current data set 162A'. This subset can include the 'current verification value' such as the total checksum and some other identifying information (e.g., a name of a managed object and an identifier of an information 'type' that was received.) This information can be saved in the managed object database 161. The store process 145 can use this saved information to determine if another set of current management data 162A' received from an agent corresponds to this set (i.e., contains an update to managed objects associated with this set of data).

By being able to quickly and efficiently identify those portions of management data in the current management data set that the agent 155 has indicated as being changed (and by being able to verify the authenticity and accuracy of this data, as will be explained), the store process 145 configured according to embodiments of the invention does not need, in most cases, to copy or translate the entire contents of the current management data set 162A' into managed object data 164 storage within the management database 161. Instead, the store process 145 only operates on those fields that are indicated as being different or changed (e.g., modified, added or deleted) thus conserving significant processing resources of the store process 145 and shortening the time it takes to update the management database 161 with management data collected from managed entities 120. Due to the efficiencies gained by embodiments of the invention, the store process 145 is able to handle more agent transactions in a shorter amount of time for more agents 155 as opposed to conventional systems designs in which the store process must replace the entire set of managed object data 160 for those management objects associated with a current set of received management data each time such a set is received from an agent.

Further details of the processing performed according to embodiments of the invention by an agent 155 will now be explained with respect to the flow chart of processing steps of the agent 155 shown in FIGS. 5 and 6 and in conjunction with reference to the example storage area network 100 in FIGS. 1 and 2.

Figure 5:
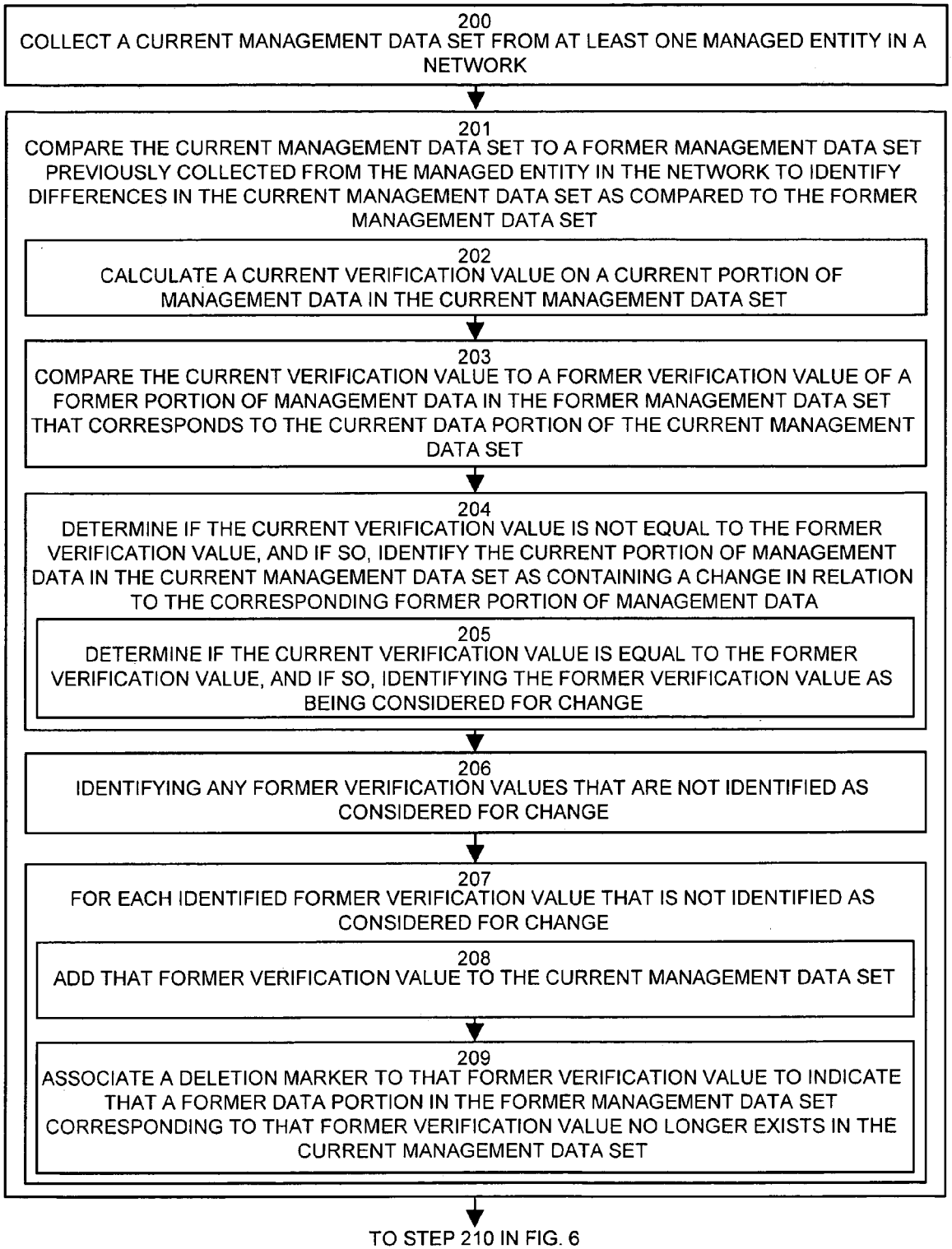
FIGS. 5 and 6 are a flow chart of processing steps that show details of operation of an agent process configured to identify changes in management data according to embodiments of the invention.
Figure 6:
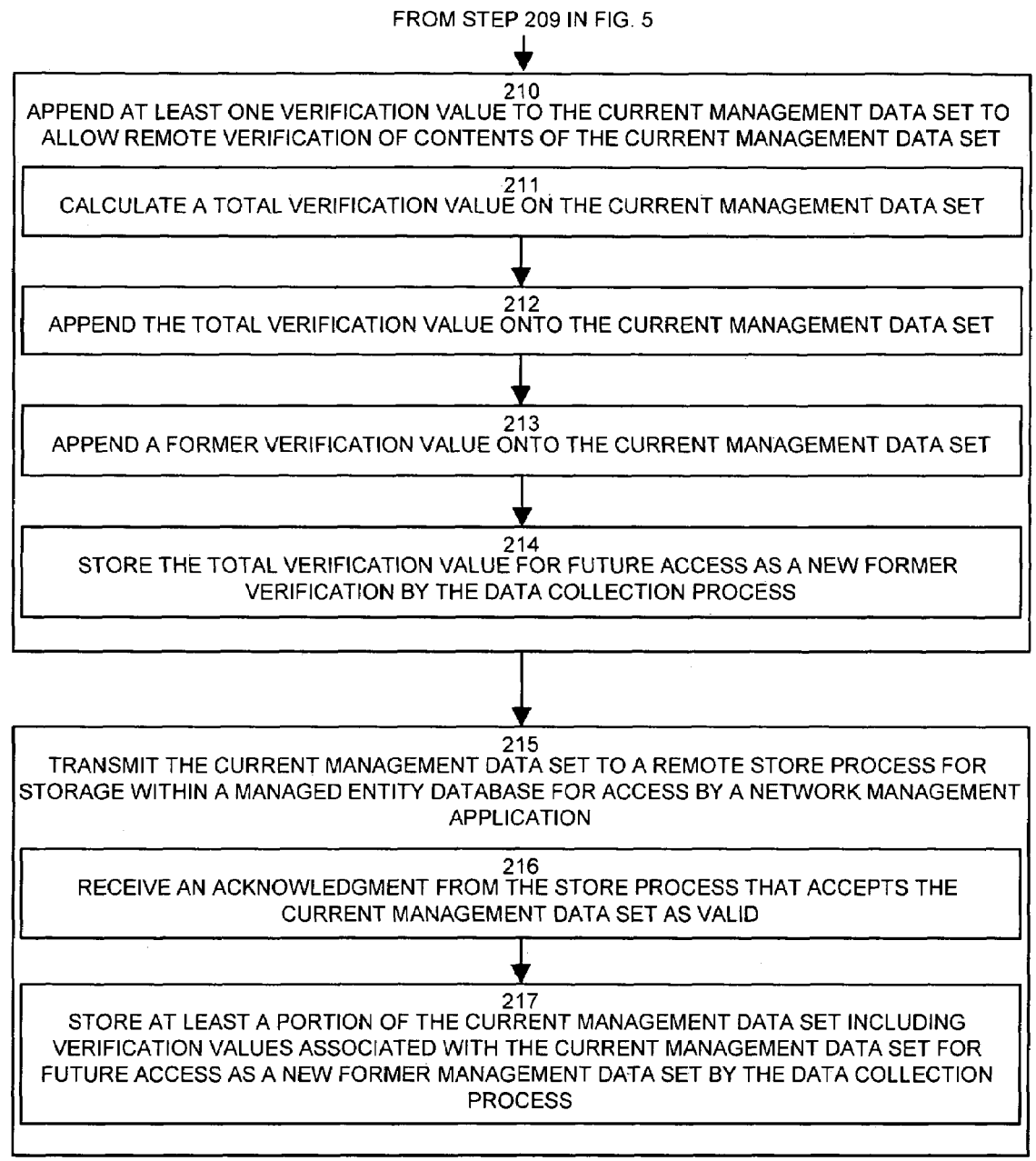

FIGS. 5 and 6 are a single flow chart of processing steps performed by the agent 155 in order to process management data for provision to a plurality of store processes in accordance with one example embodiment of the invention.

In step 200, the agent 155 collects a current management data set 162A from at least one managed entity in a network. This can involve the agent 155 periodically contacting one or more managed entities 120 (and/or 110 in FIG. 1) assigned for management by that agent 155 such as the data storage system managed entity 120 shown in FIG. 2. The agent 155 can query the managed entity 120 to collect necessary management data or alternatively, the managed entity 120 can periodically transmit, push or otherwise provide the management data 162A to the agent 155. The current management data set 162A represents raw management data that may be, for example, a table obtained in a database format from the managed entity 120.

In step 201, the agent 155 compares the current management data set 162A to a former management data set 162B previously collected from the managed entity 120 in the network to identify differences or changes in the current management data set 162A as compared to the former management data set 162B. Details of this processing will be explained with respect to sub-steps 202 through 209 in FIG. 5.

In step 202, the agent 155 calculates a current verification value on a current portion of management data in the current management data set 162A. The current management data set 162A may be arranged in a data structure such as a table, array, list or other organized manner so as to allow the agent 155 to identify individual data portions or fields of the current management data set 162A. In step 202, the agent 155 calculates, for example, a checksum value, a hash value or other numerically computed value that serves as the current verification value on a portion of management data (e.g., on a particular field or index to a field, as will be explained) within the current management data set 162A.

In step 203, the agent 155 compares the current verification value (computed in step 202) to a former verification value of a former portion of management data in the former management data set 162B that corresponds to the current data portion of the current management data set. The data portions referred to in steps 202 may be management data, or alternatively, may be database keys that reference specific portions of management data. As an example of step 203, if the agent 155 computed a checksum value on a management data field of the current management data set 162A, in step 203 the agent can compare this checksum value with a formerly computed checksum value on an equivalent or corresponding field in the former management data set 162B.

In step 204, the agent 155 determines if the current verification value is not equal to the former verification value, and if so (i.e., if they are not equal to each other), then the agent 155 identifies the current portion of management data in the current management data set 162A as containing a change in relation to the corresponding former portion of management data 162B. Specific examples and variations of this processing will be provided shortly.

In step 205, if the agent 155 determines that the current verification value is not equal to the former verification value (i.e., as determined in step 204), the agent 155 also identifies the former verification value within the former management data set 162B as being (i.e., as having been) "considered" for change. In other words, in step 205, the agent 155 can track whether or not data portions or fields within the former management data set 162B have been compared against corresponding fields in the newly collected current management data set 162A. One purpose of this is to allow the agent 155 to identify any additions and/or deletions made to the management data based on removed data as identified during the comparison process between the current management data set 162A and the former management data set 162B. Note that for additions to the current set, there will be no corresponding portion of data in the former set 162B. As such, to handle additions, when the portion of the current management data set being processed, the addition can be identified (since there is no matching former checksum) when agent creates a checksum, hash value or other numerically computed value based on the key data and attempts to use this value to index into the former management data set. Since the data is new however, there is no corresponding value in the former management data set, and thus the data upon which the checksum was calculated is new and can be marked as such.

The agent 155 can repeat the processing of steps 202 through 205 for a plurality of current and corresponding former portions of management data in the current and former management data sets 162A and 162B, respectively, such that the agent 155 identifies all current portions of management data that differ from former portions of management data are identified within the current management data set. Certain data portions may be excluded from this processing due to the fact that differences will always exist between corresponding data fields such as time stamps, dates and other information that continually changes over time.

When the processing loop defined by steps 202 through 205 is complete, the agent 155 will have performed a comparison of corresponding data portions within the current and former management data sets and will have compared verification values such as checksums associated with data portions contained in the former management data set 162B to newly calculated or computed checksum verification values based on the current values of current management data portions recently collected from the managed entity by the agent 155. In this manner, embodiments of the invention can use verification values such as checksums to perform comparisons on a field by field or data portion by data portion basis to identify which portions of the managed data set differ from corresponding portions having values previously collected.

A simplified example of a data structure for maintaining the current management data set 162A' including associated verification values and change indicators is shown by the current management data set table below:

TABLE 1

EXAMPLE CURRENT MANAGEMENT DATA SET 162A'

| Changed? (indicates change to data portion) | Index Verf. Value (e.g., checksum on DB key) | Index data portion (e.g., DB key of a row in table) | Data portion Verf. Value (e.g., checksum on data portion itself) | Data portion (e.g., value(s) of data in row to which Index data identifies) |
|---|---|---|---|---|
| DIFF | 123456 | Row1 | 54321 | Data storage XYZ |
| SAME | 345678 | Row2 | 87654 | 100 MB Capacity |
| NEW | 567890 | Row3 | 10986 | Volumes = 10 |
| DELETE | 345656 | Row4 | — | — |

The above table provides a simplified example of hypothetical contents of a current management data set 162A' after processing by the agent 155 in accordance with embodiments of the invention explained above in steps 202 through 205. The actual values or content of management data that the agent 155 collects from the managed entity 120 are shown in Columns 3 (database key values) and 5 (data portions corresponding to the database keys) in the above table. Assuming for this example that this information is arranged within a database format when obtained from the managed entity by the agent 155, Column 3 of the above Table 1 indicates index data portions such as database keys to rows in a database containing the respective data portions shown in Column 5. Column 2 contains a respective verification value such as checksum value that the agent 155 calculates in step 202 on the index data portion in Column 3 (i.e., Column 2 is a checksum value on the data in Column 3 and is thus computed by the agent on the database key(s) of a row containing one or more data portions of management data). Likewise, Column 4 contains a respective verification value such as checksum value that the agent 155 calculates in step 202 on the data portion value in Column 5 (i.e., Column 4 is a checksum value on Column 5 that the agent 155 computes on the data (i.e., fields) of the database row itself). Column 1 contains a change identifier or indicator that indicates whether or not the data portion value from Column 5 contains the same data (or new data, or deleted data as will be explained shortly) as a corresponding data portion that may be contained within the former management data set 162B data structure to manner similar to the above table. In other words, the outcome of step 204 is indicated in Column 1 of the above example current management data set 162A'. If a change indicator field is marked "SAME", in one embodiment this means that both the index verification values and data verification values in the former and current data sets 162A' and 162B are the same, and thus no change is present in the data portion in Column 5 between each of these data sets 162A' and 162B. Note that Column 1 as will be explained can be used to store change indicators such as NEW and DELETE as well to indicate newly added or deleted data.

Directing attention to the specific four example rows in the above current management data set 162A', the change indicator "DIFF" in row 1 of the above table indicates that the data portion containing the value "Data Storage XYZ" is somehow different than a corresponding data portion in the former management data set 162B. For row 2, the change indicator "SAME" indicates that the data portion value "100 MB Capacity" is the same in both the current management data set 162A and the former management data set 162B. For row 3, the change indicator "NEW" indicates that this row contains an entirely new data portion having a value "Volumes=10" that was not present in the former management data set 162B. Finally, row 4 contains a change indicator labeled "DELETE" and contains no value for the corresponding data portion in Column 5. The change indicator label "DELETE" indicates a row or other data portion that existed in the former management data set 162B no longer exists in the current management data set 162A collected from the managed entity during this operation of the agent 155.

The hypothetical example Table 1 above in combination with a former management data set 162B example in Table 2 below can be used to explain how the agent 155 can perform a comparison between the current and former management data sets to indicate within the current management data set any changes between the current and former management data associated with a particular managed entity 120.

The following table shown below is a corresponding hypothetical example of a former management data set 162B that the agent 155 stores and uses to perform the aforementioned processing to produce the results of Table 1 shown above:

TABLE 2

EXAMPLE FORMER MANAGEMENT DATA SET 162B

| Considered for change? | Index Verf. Value (e.g., checksum on DB key) | Index data portion (e.g., DB key of a row in table) | Data portion Verf. Value (e.g., checksum on data portion itself) | Data portion (e.g., value(s) of data in row to which Index data identifies) |
|---|---|---|---|---|
| x | 123456 | Row1 | 98765 (JPS if it were 54321 they would be tge same) | Data storage QRS |
| x | 345678 | Row2 | 87654 | 100 MB Capacity |
|  | 345656 | Row4 | 51728 | Old Data |

Table 2 above provides a simplified example of hypothetical contents of a former management data set 162B. In this example, the first row of the former management data set 162B corresponds to the first row of the current management data set 162A' shown in Table 1 above, however, the former data portion value "Data storage QRS" in Table 2 is different than the current data portion value "Data Storage XYZ" in Table 1. As such, the processing above causes the agent 155 to provide the change indicator "DIFF" to indicate the difference in the two data portions. The second row in the former management data set 162B in Table 2 contains the same data portion (Column 5) value as the corresponding data portion (Column 5) in row 2 in the example current management data set 162A shown in Table 1. As such, the agent 155 assigns the change indicator "SAME" to this row in Table 1 since no change exists between these rows. Note that for both rows one and two in Table 2 above, the agent 155 indicates that these rows (and hence the corresponding data portions in Column 5) were "considered" for a change during agent processing of steps 202 through 205 as explained above. However, row three containing the data portion value "Old Data" is not marked as being considered for a change (in Column 1 of Table 2) by the agent 155 based on the aforementioned processing since there is no corresponding field or data portion for this data that was collected within the current management data set 162A from the managed entity 120. In other words, this data portion was deleted in the current management data set 162A, but formerly existed in the former management data set 162B.

It is to be understood that the above examples of current and former management data sets 162A and 162B are provided by way of example only and are not limited to embodiments of the invention. Rather, the simplified examples presented above and explained here and are intended to illustrate the principles and concepts of the invention and is to be understood that management data, verification values, change indicators and the like may differ implementation from the above simplified examples.

Using the information from the current and former management data sets 162A and 162B (TABLE 1 and TABLE 2 above), one embodiment of the invention can efficiently determine in steps 202 and 203 (explained generally) above whether of not a portion of data in the current management data set 162A is changed in comparison to the former set of management data 162B. One embodiment can use the index data portions or database keys to perform change detection efficiently.

Generally, the agent 155 can use the index verification values (e.g., checksums of former database keys) in Column 2 of Table 2 in comparison to calculated index verification values (e.g., checksums) of index data portions (e.g., database keys) from the current data set 162A' to find matching rows. Once a row match is found, the agent 155 can then use the data portion verification value in Column 4 of the former set 162B (e.g., a checksum on the former data portion) in comparison with a calculated data portion verification value computed on the current data portion (e.g., a checksum calculated on the data portion in Column 5 for the row in Table 1 having the matching index verification portion) to see if the data portions (i.e., the actual current and former management data) are the same.

Specifically, in such an embodiment, in step 202, the agent 155 can calculate, on each row, a current index verification value (Column 2 Table 1) on current index data that indexes the current portion of management data (Column 5 in Table 1) in the current management data set 162A'. Then in step 202, the agent can compare the current index verification value Column 2) to an index map that maps former index verification values associated with former index data (e.g., Column 2 in Table 2) that indexes former portions of the management data in the former management data set 162B (i.e., can compare the checksum value computed in step 202 to the checksums of index values in Column 2 of the former data set 162B) to determine which rows in the current set 162A' correspond to each other (but that do not necessarily having matching data portions with each other). In other words, by computing a checksum on the database key value for a row of current data (i.e., data portions), the agent 155 can use this checksum in step 203 to map to a former checksum in Column 2 of the former management data set 162B. A former and current row with the same index data portion checksum correspond to each other and may have data portions that match (or that may have changed since collection of the former set 162B).

If the agent 155 discovers that the current index verification value (a checksum of a key, as indicated in Column 2 of Table 1) maps to the former index verification value (an equal checksum of a key in Table 2), then the agent "knows" that two data portions correspond to each other. At this point, the agent can then obtaining the former data portion verification value in Column 4 of Table 2 (from the former set 162B) for the matching row (i.e., from the former data set row having the matching database key checksum to the current data set row). Using this, in step 203, the agent 155 can calculate a current data portion verification value (i.e., the checksum in Column 4 of Table 1 for the matching row) on the current portion of management data (Column 5) in the current management data set 162A that corresponds to the current and matching index verification value. In step 203, the agent 155 can compare the current data portion verification value (e.g., the checksum in Column 4 in Table 1 for the current matching row) to the former data portion verification value (e.g., the checksum in Column 4 in Table 2 for the former matching row) and if the current data portion verification value (i.e., Column 4 Table 1 in set 162A) is not equal to the former data portion verification value (Column 4 Table 2 in set 162B), the agent 155 can identify the current data portion corresponding to the current index verification value in the current management data set 162A' as containing a change. This is because the checksums on the two corresponding data portions are not equal for data portions that have the same database key.

Alternatively, in step 202, if the current index verification value (Column 2 Table 1) does not map to a former index verification value in the index map (e.g., Column 2 Table 2), then the agent can identify the current data portion (Column 5 in Table 1) that corresponds to the current index data (Column 3 Table 1) as being a new current data portion of current management data in the current management data set 162A (i.e., by creating the "NEW" change indicator). In response to detecting a new data portion (that has no corresponding database key checksum in Column 2 of Table 2), the agent 155 in step 204 in this embodiment can also calculate a new current data portion verification value (e.g., a checksum for use in Column 4 in Table 1) for that new current data portion (i.e., Column 5) and can append the current data portion verification value calculated on the new current data portion to the current management data set 162A' (for example, by saving this checksum in Column 4 of Table 1).

In the aforementioned specific embodiment of steps 202 through 204 then, the agent can use checksums on the index data or database keys to rows in a database table to first identify if those rows in the current collected management data set 162A match any checksums of index data (i.e., database keys) of rows of the former management data set 162B. If there is a match, the agent 155 can compare checksums on the data in each set and if they match, then there is no change to the data. If the index checksums do match but the data portion verification checksums do not match, then the data portion is indicated as being changed. If Table 2 does not contain the index verification values of a database key at all, then the current data set 162A has new data that must be added to the management database 161 as explained below.

Returning attention now back to the processing steps in the flowchart in FIG. 5, after all current portions of management data (in Column 5) that differ from former portions of management data (in set 162B) are identified within the current management data set 162A', in step 206, the agent 155 identifies any former verification values that are not identified as considered for change. In other words, using the above example, the agent 155 consults Column 1 of Table 2 to identify which former management data portions in the former management data set 162B were not considered for a change in comparison to data portions existing in the current data set 162A. Rows or data portions that correspond to this identification are fields that were deleted or removed within the managed entity when transitioning from former management data set 162B to the current management data set 162A. In other words, any fields not indicated in Table 2 as being considered for a change are to be deleted from the management database.

Accordingly, in step 207, the agent 155 enters a processing loop of steps 208 and 209 that is performed for each identified former verification value that is not identified as considered for change (i.e., for each empty valued row in Column 1 of Table 2 above).

In step 208, within the processing loop defined by step 207, the agent 155 adds (e.g., copies) the former index data from the former data set 162B to Table 1, Row 4, Column 3 as a new row in the current management data set 162A'. Row 4, column 1 is marked as DELETE as explained in step 209 below. Note that in this embodiment, since the portion was deleted, the agent 155 only copies the former index data portion value (i.e., database key value) to the deleted entry from the former management data set 162B to the current management data set 162A' and does not need to copy over the data itself. This information added to Table 1 will allow the store process to delete corresponding managed object data 160.

Next, in step 209, the agent 155 associates a deletion marker "DELETE" to that former verification value in the current management data set 162A' to indicate that a former data portion in the former management data set corresponding to those former database values no longer exists in the current management data set 162A'. This information will allow the store process, as will be explained, to identify portions of management data that have been deleted. After the loop defined by step 207 is complete, all data portions in the former set 162B that were not considered for a change have been identified and listed with a "DELETE" change indicator in the current set 162A'

At this point in processing, the agent 155 has performed a full comparison between the current management data set 162A collected from the managed entity in relation to a formerly collected management data set 162B to the agent previously collected from the same managed entity. Any data portions or fields that the agent 155 contacts that were added, changed or deleted are indicated as such in order to produce the current management data set 162A'. After processing of step 209 is complete, the agent 155 prepares the current management data set 162A' for transmission to the store process 145. Agent processing continues at step 210 in FIG. 6.

FIG. 6 is a continuation of the flow chart of agent processing steps from FIG. 5.

In step 210 in FIG. 6, the agent 155 appends at least one verification value to the current management data set to allow remote verification of contents of the current management data set. This can include calculating one or more checksums on the full current management data set 162A'.

Specifically, in step 211 the agent 155 calculates a total verification value on the current management data set 162A. The store process can use this information to validate the accuracy of receipt of the current management data set 162A.

In step 212, the agent 155 appends the total verification value onto the current management data set 162A.

In step 213, the agent 155 appends a former verification value onto the current management data set 162A. In one embodiment, the former verification value that the agent 155 appends to the current management data set is a former total verification checksum value the agent formerly calculated on the former management data set 162B. As will be explained shortly, the store process 145 can use the former checksum of the total former management data set (that it will receive from being appended to the current management data set 162A) to determine if the agent 155 is the same agent or is an agent that has the same "view" of the former data as the agent that formerly corresponded with the store process 145 to produce the former management data set 162B. In other words, by attaching the former checksum value of the former management data set to the current management data set 162A, the agent allows the store process 145 to confirm that the agent 155 is the same agent or is an agent that has the same view of the former data as the agent that provided the former management data set 162B.

Next, in step 214, the agent 155 stores the total verification value (e.g., the total checksum) for future access as a new former verification value for use by that agent 155 during a subsequent iteration of the aforementioned processing.

In step 215, the agent 155 transmits the current management data set 162A' to a remote store process 145 for storage within a management database 161 for access by a network management application 132. This processing can include the processing explained below and sub-steps 216 and 217.

In step 216, the agent 155 receives an acknowledgement from the store process 145 that accepts the current management data set as valid. In other words, after transmission of the current management data set 162A' to the store process 145, the agent awaits receipt of an announcement indicating that the store process 145 was able to correctly receive and process the current management data set 162A'.

In step 217, in response to receiving the acknowledgment, the agent 155 stores at least a portion of the current management data set 162A' including verification values associated with the current management data set for future access as a new former management data set 162B. In other words, in step 217 the agent 155 maintains a copy of the current management data set 162A' that was most recently sent to the store process 145 for use as a former management data set 162B upon a subsequent iteration of the processing explained above. This processing can involve replacing the former set 162B in the agent with the current set 162A'.

In this manner, the agent 155 is able to provide, to the store process 145, the current management data set 162A' that indicates all changes or differences between the most recently collected management data and a former set of management data previously provided. As will be explained next, the store process 145 can accept this and process the current management data set to incorporate any changes indicated therein within the management database 161.

Figure 7:
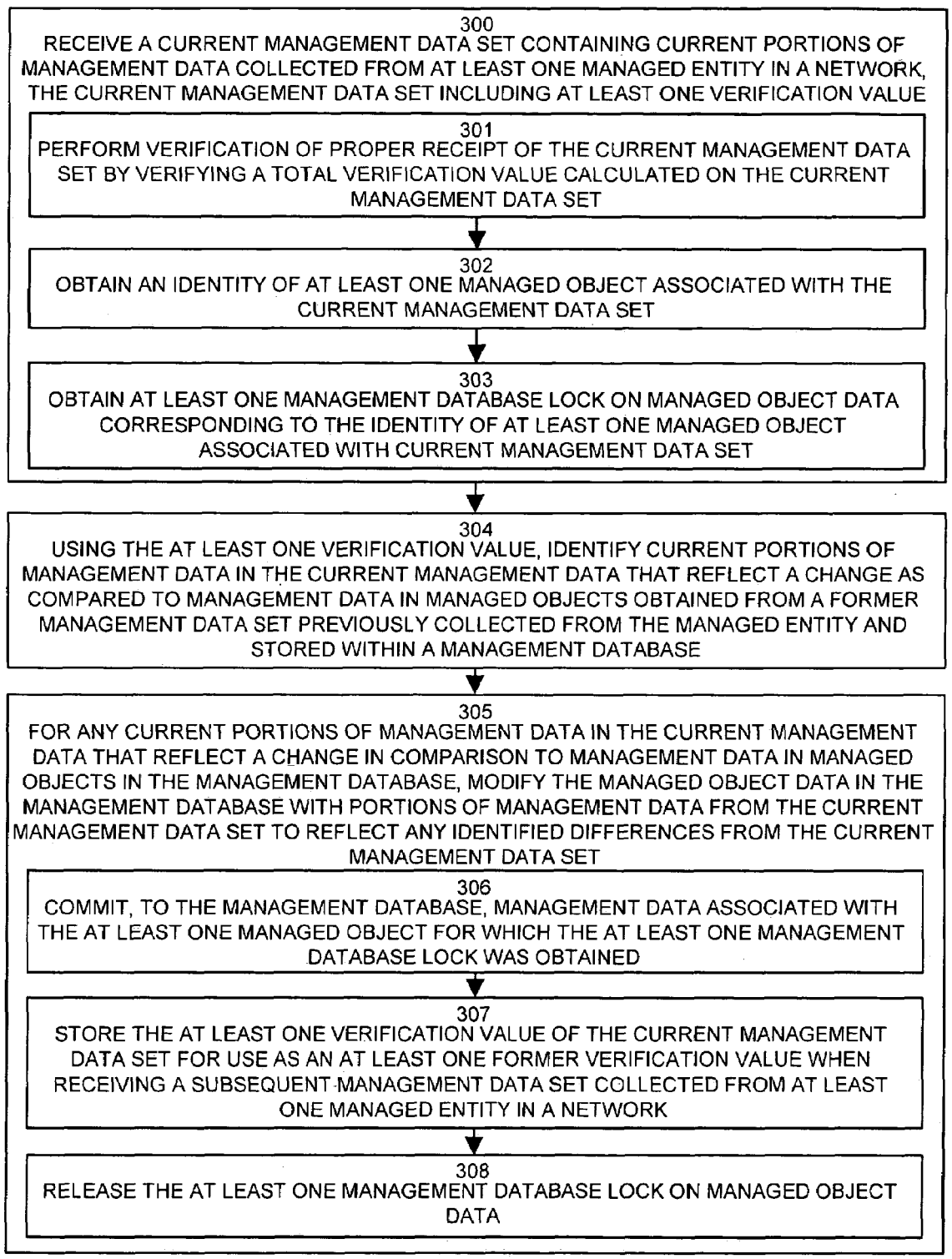
FIG. 7 is a flow chart of processing steps that show details of operation of a store process configured to process change identified by the agent process to update a management database according to embodiments of the invention.

FIG. 7 is a more detailed flow chart of processing steps performed by a store process 145 in accordance with example embodiments of the invention to receive and process a current management data set 162A' from an agent 155 assigned to operate with that store process 145.

In step 300, the store process 145 receives a current management data set 162A' containing current portions of management data collected from at least one managed entity (e.g., 120 in FIG. 2) in a network (e.g., in storage area network 100 in FIG. 1). The current management data set 162A' includes at least one verification value such as a checksum and can include change indicators identifying changes in this current management data set 162A'. Sub-steps 301 through 303 provide details of processing that the store process 145 performs to receive a current management data set 162A'.

In step 301, the store process 145 performs verification of proper receipt of the current management data set 162A' by verifying a total verification value such as a checksum calculated on the current management data set. In step 302, the store process 145 obtains an identity of at least one managed object associated with the current management data set. This includes identifying those managed objects 160 in the management database 161 that maintain management data that corresponds to the data portions contained within the current management data set 162A'.

In step 303, the store process 145 obtains at least one management lock on managed object data 160 corresponding to the identity of at least one managed object associated with current management data set 162A'. In this manner, while the store process 145 integrates changes from the current management data set 162A' into the managed object data 160 in the management database 161, other store processes 145-Z that may require access to the same managed object data 160 will be excluded from some access (e.g., write access) while the current store process 145 maintains the lock on these objects 160.

Next, in step 304, the store process 145, using the verification values and change 1 indicators (e.g., Columns 1 in the example current management data set 162A' in Table 1 above), identifies current portions of management data (Column 3 and 5 in Table 1) in the current management data set 162A' that reflect a change as compared to management data in managed objects 160 obtained from a former management data set 162B previously collected from the managed entity 120 and stored within the management database 161.

Next, in step 305, for any current portions of management data (Column 3 and 5 in Table 1) in the current management data set 162A' that reflect a change (Column 1 in Table 1) in comparison to management data in managed objects in the management database, the store process 145 modifies the managed object data 160 in the management database 161 with portions of management data (Column 3 and 5) from the current management data set (Table 1) to reflect any identified differences from the former management data set 162B. The processing of step 305 includes sub-steps 306 through 308.

In step 306, the store process 145 commits, to the management database 161, management data associated with the managed object(s) 160 for which the management lock was obtained in step 303. This causes the database to store the managed object data 160 containing the changes reflected in the current management data set 162A'.

In step 307, the store process 145 stores the total verification value (i.e., the checksum) of the current management data set 162A' for use as a former verification value. In step 308, the store process 145 releases the management lock(s) related to the managed object data 160, thus allowing other processes to access this data in the management database 161.

In this manner, the store process 145 is able to integrate the changes reflected in the current management data set 162A' into the managed object database 160. Details of processing associated with the operations of identifying management data indicated as having been changed within the current management data set 162A', and of modifying the management database to integrating these changes into managed object data 160 are explained in detail with respect to the flow chart of processing steps in FIGS. 8 and 9.

Figure 8:
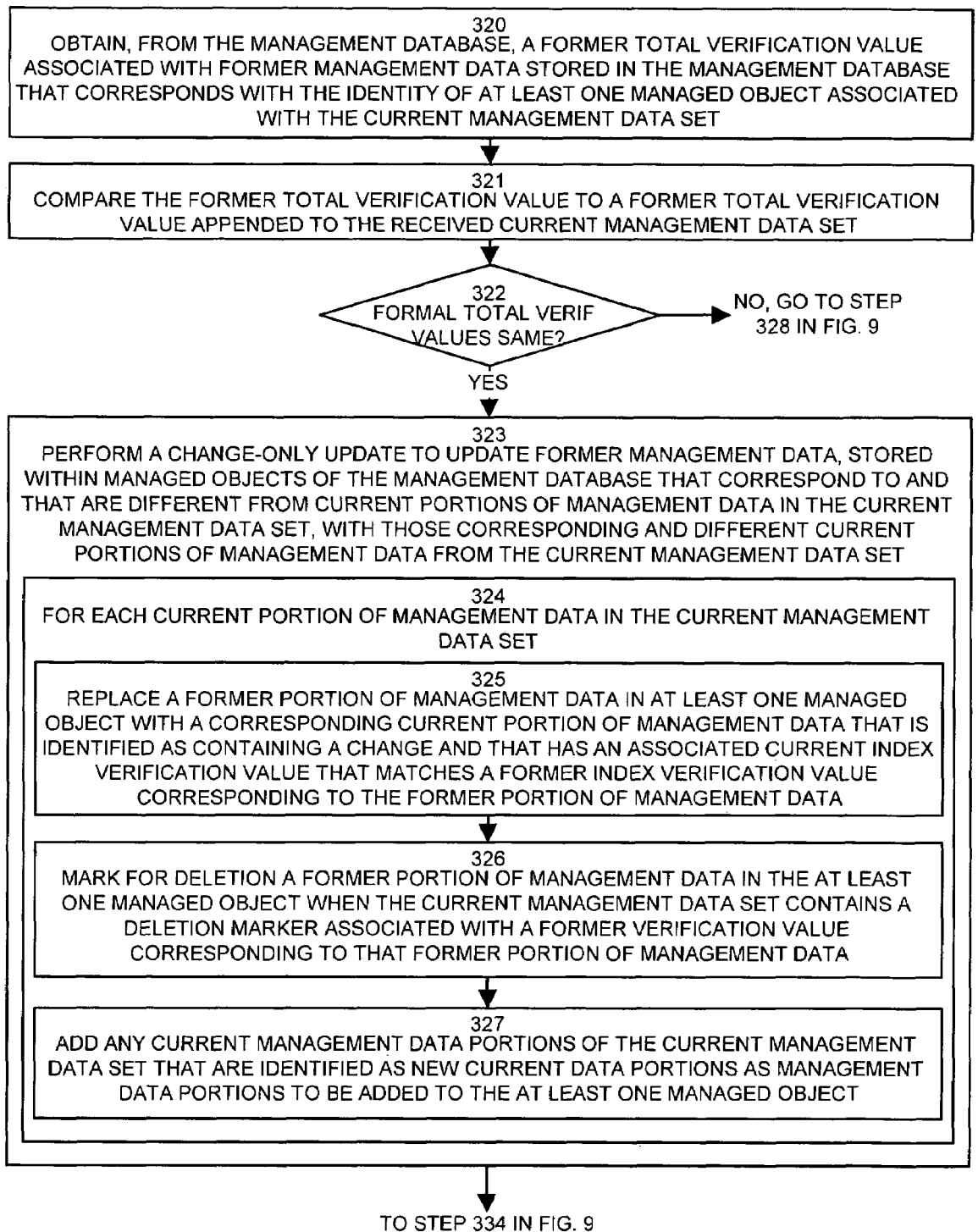
FIGS. 8 and 9 are a flow chart of processing steps that show details of operation of the store process configured to process changes in management data according to embodiments of the invention.
Figure 9:
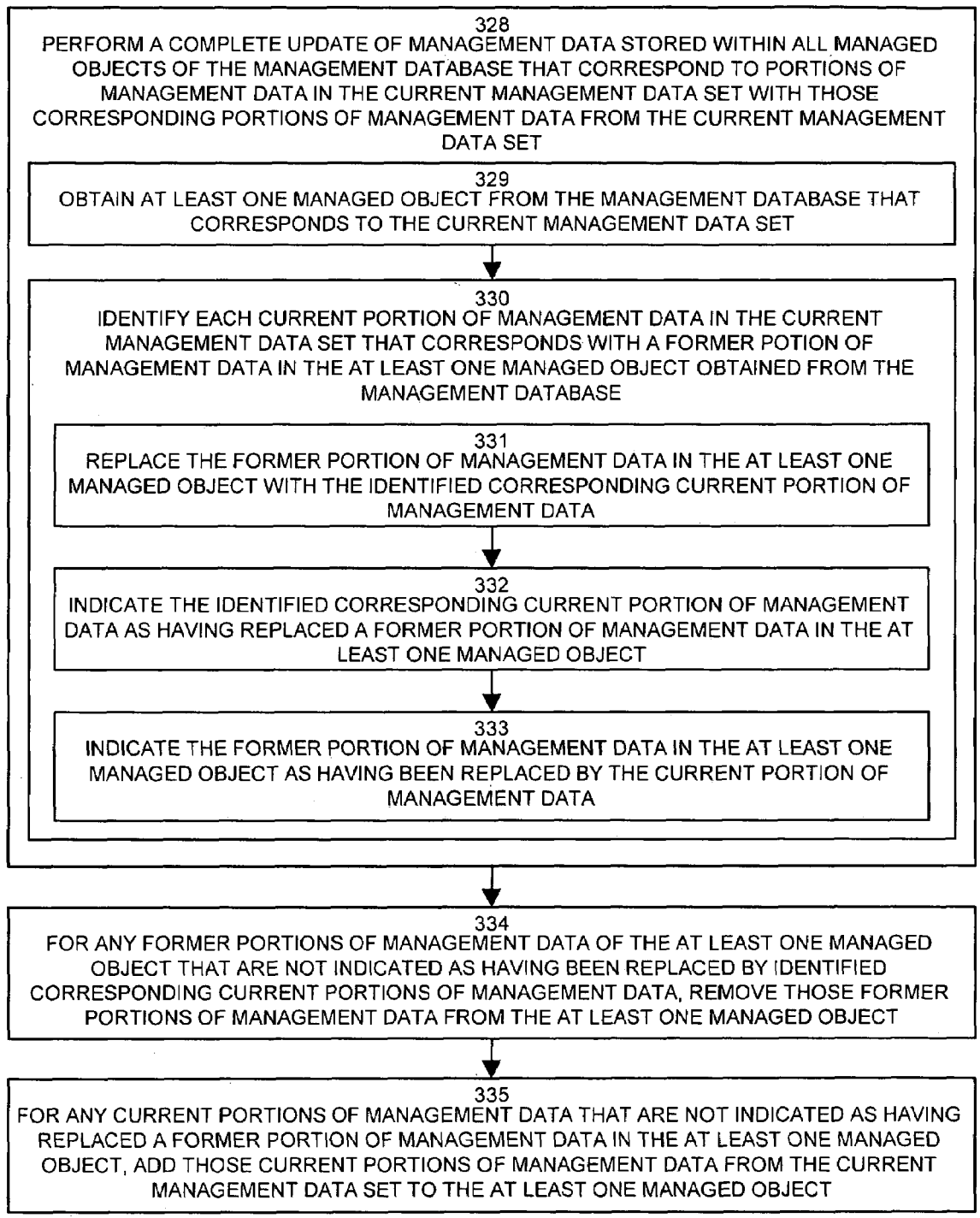

FIGS. 8 and 9 are a single flow chart of processing steps performed by a store process 145 configured in accordance with embodiments of the invention that show details of processing the current management data set 162A' received from an agent 155 into managed object data 160 stored in the management database 161.

In step 320, the store process 145 obtains, from the management database 161, a former total verification value (e.g., total checksum) associated with former management data 162B stored in the management database (or stored in memory by the store process) that corresponds with the identity of the managed object(s) 160 or managed entity 120 associated with the current management data set 162A'. As an example of step 320, the store process 145 obtains the former checksum of the former management data set 162B (as saved above from a former iteration of step 307 by the store process 145).

Next, in step 321, the store process 145 compares the former total verification value (i.e., the checksum of former data saved by the store process 145) to a former total verification value appended to the received current management data set 162A'. One purpose of this is to determine if the agent 155 that submitted the current management data set 162A' is the same agent 155 that submitted the former management data set 162B or another agent with the same "view" of this data.

In step 322, if the former total verifications values are the same (i.e., both former checksums match), then the same agent 155 has sent a new set of current management data 162A' to the store process 145 and processing proceeds to step 323.

In step 323, the store process 145 performs a change-only update to update former management data, stored within managed objects 160 of the management database 161 that correspond to and that are different from current portions of management data (i.e., Column 5 in Table 1) in the current management data set 162A'. The change-only update process only updates those corresponding and different (i.e., changed) current portions of management data from the current management data set 162A', thus saving processing time since portions or values of management data that are the same as the former set need not be updated. Details of performing a change-only update are shown in sub-steps 324 through 327.

In step 324, the store process 145 enters a processing loop of sub-steps 325 through 327 that take place for each current portion of management data in the current management data set 162A'.

In step 325, the store process 145 replaces a former portion of management data in at least one managed object with a corresponding current portion of management data that is identified as containing a change (e.g., DIFF in Column 1 of Table 1). Thus, two data portions that have the same database key value (one data portion from Column 5 of Table 1 in the current set 162A', and the other access using the database key corresponding to the managed object) will be updated to contain the newest data if Column 1 indicates a "DIFF" (i.e., different) change indicator in the current management data set 162A' (e.g., Table 1).

In step 326, the store process 145 marks for deletion a former portion of management data (e.g., a managed object) in the management database 161 when the current management data set contains a deletion marker (e.g., DELETE in Column 1 of Table 1) associated with a former verification value corresponding to that former portion of management data. In this manner, any management data that is indicated as deleted in the current management data set 162A' is removed from the managed object data (i.e., the object is deleted).

In step 327, the store process 145 adds any current management data portions of the current management data set that are identified as new current data portions (i.e., NEW in Column 1 of Table 1) as new management data (e.g., adds at least one new managed object 160). This allows the store process 145 to store new fields or data portions into the managed object data 160 that did not appear in the former set 162B.

In this manner, the processing loop defined by step 324 causes the store process 145 to only have to update managed object data 160 for data portions identified as either being new, different or deleted in the current set of management data 162. Any fields that are marked the SAME can be ignored, since those fields do not need to be updated. This thus conserves processing resources used by the store process 145.

Returning attention to step 322, if the former total verification values are not the same (i.e., the former checksum sent from the agent is different that than the former checksum saved by the store process 145 on a former iteration of management data processing), then the agent 145 may be a different agent supplying the current set of management data. As such, processing in step 322 proceeds to step 328 in FIG. 9.

FIG. 9 is a continuation of the flow chart of processing steps in FIG. 8.

In step 328 in FIG. 9, the store process 145 performs a complete update of management data stored within all managed objects 160 of the management database 161 that correspond to portions of management data (Column 5 in Table 1) in the current management data set 162A'. The complete update essentially replaces the entire contents of former managed objects 160 with the content of management data portions (i.e., every value of Columns 3 and 5 in Table 1) from the current management data set 162A' (for object corresponding to or storing values for those data portions). This may include deleting and adding managed objects as well. In this manner, the store process 145 performs a full replacement of management data. Details of this processing are shown in sub-steps 329 through 333.

In step 329, the store process 145 obtains at least one managed object 160 from the management database 161 that corresponds to the current management data set 162A'. The objects 160 can be identified, for example, based on what managed entity the data set 162A' corresponds to. This can be determine, for example, by the identity of the agent 155 sending the current set 162A', or by the identity of the managed entity 120 to which the current set applies, or from information contained in the set 162A' itself, such as database key information.

In step 330, the store process 145 identifies each current portion of management data in the current management data set that corresponds with a former potion of management data in the at least one managed object obtained from the management database, and in response performs sub-steps 33i through 333.

In step 331, the store process 145 replaces the former portion of management data in the corresponding managed object 160 with the identified corresponding current portion of management data (i.e., Column 5 in Table 1).

In step 332, the store process 145 indicates the identified corresponding current portion of management data as having replaced a former portion of management data in the managed object 160. In this manner, the store process 145 keeps track of which portions of management data from the current set have replaced existing (i.e., former) management data in the management objects 160.

Next, in step 333, the store process 145 indicates that the former portion of management data in the at least one managed object has been replaced by the current portion of management data. This allows the store process to identify which portions of the managed object 160 have been replaced.

Upon completion of the processing of steps 329 through 333, the entire current management data set 162A' has been processed against existing managed object fields that match data portions in this set.

After this is complete, in step 334, the store process 145 performs a processing operation for any former portions of management data of the managed object(s) that are not indicated as having been replaced by identified corresponding current portions of management data and the store process 145 removes those former portions of management data from the at least one managed object (e.g., in most cases this identifies a managed object that needs to be deleted). In other words, if after processing steps 329 through 333 there remain some data portions (e.g., managed objects) corresponding to the current management data set that were not considered for processing (i.e., that did not match any fields in the Table 1), then those portions of data in the managed object data 160 are deleted.

Next, in step 335, the store process 145 performs a processing operation that occurs for any current portions of management data that are not indicated as having replaced a former portion of management data in the at least one managed object. In such cases, the store process in step 334 adds those current portions of management data from the current management data set to the at least one managed object. That is, if there are database key fields (i.e., Column 3) that did not match database key fields in the managed object data 160, those fields must be new fields that the agent detected from the managed entity. As a result, in step 335, those data portions are added from the current management data set 162A' as new fields in the managed object data 160. Note that if the current management data set is not verified as equivalent to the last received by the store process, the change set calculated is inaccurate and the Column 1 information cannot be used, as it may be incorrect The aforementioned processing steps illustrate example embodiments of the invention. It is to be understood that alternatives to such embodiments will now be apparent to those skilled in the art. Such alternatives are intended to be considered alternative embodiments. As an example, as explained above, the verification values are stored within the current and former sets of management data 162A' and 162B. This does not have to be the case and such information could be maintained in a separate data structure.

Figure 10:
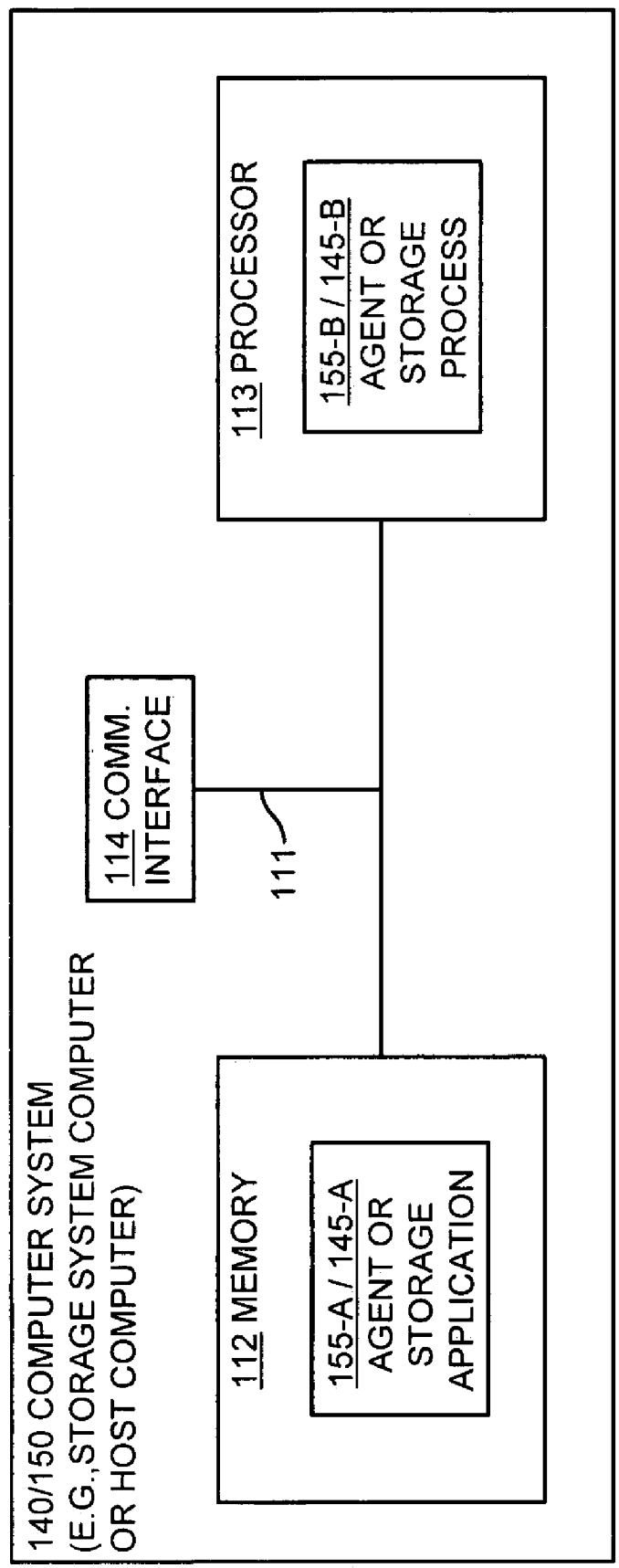
FIG. 10 illustrates an example computer system architecture for either a host computer system that operates an agent or a storage computer system that operates a store process in accordance with embodiments of the invention.

FIG. 10 illustrates example architectures of a computer system that is configured as either a host computer system 150 or a storage computer system 140. The computer system may be any type of computerized system such as a personal computer, workstation, portable computing device, mainframe, server or the like. In this example, each includes an interconnection mechanism 111 that couples a memory system 112, a processor 113, and a communications interface 114. The communications interface 114 allows the computer systems 140 and 150 to communicate with each other over the storage area network 100.

The memory system 112 may be any type of computer readable medium that is encoded with an application 145-A, 155-A that represents software code such as data and/or logic instructions (e.g., stored in the memory or on another computer readable medium such as a disk) that embody the processing functionality of embodiments of the invention for either the agent 155 or the store process 145 as explained above. The processor 113 can access the memory system 112 via the interconnection mechanism 111 in order to launch, run, execute, interpret or otherwise perform the logic instructions of the applications 145-A (for the storage computer) or 155-A (for the host) in order to produce a corresponding agent or store process 155-B, 145-B. In other words, the agent and store processes 155-B and 145-B represent one or more portions of the agent and storage application 155-A and 145-A1 performing within or upon the processor 113 in the computer system. It is to be understood that the agent 155 and storage process 145 operating as explained in former examples are represented in FIG. 10 by either one or both of the agent and storage application 155-A, 145-A and/or the process 145-B, 155-B.

Is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 112 (e.g., within random access memory or RAM). It is also to be understood that other embodiments of the invention can provide the applications operating within the processor 113 as the processes. While not shown in this example, those skilled in the art will understand that the computer system may include other processes and/or software and hardware components, such as an operating system, which have been left out of this illustration for ease of description of the invention.

Other alternative arrangements of the invention include rearranging the processing steps explained above in the flow charts in such a way that the overall effect of the invention is the same. It is to be thus understood by those skilled in the art that the particular arrangement of processing steps in many instances does not specify implementation of embodiments of the invention. As such, those skilled in the art of software development and computer-related technologies will understand that there can be many ways and orders of representing the processing operations explained above and such alternative software code will still achieve the overall effects explained herein. In addition, embodiments of the invention are not limited to operation on the computer systems shown above. The agents, store processes and management server (including change manager) can operate on shared computing resources, or can be distributed among any number of computer systems. Furthermore, embodiments of the invention are not limited to operation in a storage area network management application, but are intended to be generally applicable to any type of network management application. Accordingly, embodiments of the invention are not limited to the processing arrangements explained above.

What is claimed is:

1. In a data collection process operating in a computer system, a method for processing management data, the method comprising:
    collecting a current management data set from at least one managed resource in a network;
    comparing the current management data set to a former management data set previously collected from the managed resource in the network to identify differences in the current management data set as compared to the former management data set;
    appending at least one verification value to the current management data set to allow remote verification of contents of the current management data set; and
    transmitting the current management data set from the computer system to a remote store process operating in another computer system for storage within a management database for access by a network management application;
    wherein comparing the current management data set to a former management data set comprises:
    calculating a current verification value on a current portion of management data in the current management data set;
    comparing the current verification value to a former verification value of a former portion of management data in the former management data set that corresponds to the current data portion of the current management data set; and
    determining if the current verification value is not equal to the former verification value, and if so, identifying the current portion of management data in the current management data set as containing a change in relation to the corresponding former portion of management data.

2. The method of claim 1 wherein determining if the current verification value is not equal to the former verification value further comprises:
    determining if the current verification value is equal to the former verification value, and if so, identifying the former verification value as being considered for change.

3. The method of claim 2 comprising:
    repeating the steps of:
        i) calculating a current verification value;
        ii) comparing the current verification value; and
        iii) determining if the if the current verification value is or is not equal to the former verification value;
    for a plurality of current and corresponding former portions of management data in the current and former management data sets, respectively, such that all current portions of management data to which the repeating applies and that differ from former portions of management data are identified within the current management data set.

4. The method of claim 3 comprising:
    after all current portions of management data that differ from former portions of management data are identified within the current management data set, identifying any former verification values that are not identified as considered for change;
    for each identified former verification value that is not identified as considered for change:
        adding that former verification value to the current management data set; and
        associating a deletion marker to that former verification value to indicate that a former data portion in the former management data set corresponding to that former verification value no longer exists in the current management data set.

5. The method of claim 3 comprising:
    calculating a current index verification value on current index data that indexes the current portions of management data in the current management data set;
    comparing the current index verification value to an index map of former index verification values associated with former index data that indexes former portions of the management data in the former management data set; and
    if the current index verification value maps to the former index verification value, then:

obtaining a former data portion verification value from a former data portion in the former management data set that corresponds to the former index verification value;

calculating a current data portion verification value on fields of the current portion in the current management data set that corresponds to the current index verification value; and comparing the current data portion verification value to the former data portion verification value and if the current data portion verification value is not equal to the former data portion verification value, identifying the current data portion corresponding to the current index verification value (in the current management data set as containing a change.

6. The method of claim 5 further comprising:

if the current index verification value does not map to a former index verification value in the index map, then:

identifying the current data portion that corresponds to the current index data as being a new current data portion of current management data in the current management data set; and calculating a current data portion verification value on the new current data portion of current management data in the current management data set; and appending the current data portion verification value calculated on the new current data portion of current management data to the current management data set.

7. The method of claim 1 wherein appending at least one verification value to the current management data set to allow remote verification of contents of the current management data set comprises:

calculating a total verification value on the current management data set;

appending the total verification value onto the current management data set;

appending a former verification value onto the current management data set; and storing the total verification value for future access as a new former verification by the data collection process.

8. The method of claim 7 wherein transmitting the current management data set to a remote store process comprises:

receiving an acknowledgement from the store process that accepts the current management data set as valid; and in response to receiving the indication, storing at least a portion of the current management data set including verification values associated with the current management data set for future access as a new former management data set by the data collection process.

9. The method of claim 8 wherein:

the data collection process is an agent process operating as part of a storage area network management application;

the current index data is a database key that identifies a corresponding current data portion in a management database and wherein the index verification value is a checksum value calculated on the database key; and the current data portion verification value is a checksum value calculated on the current data portion that is database data in the management database corresponding to the database key.

10. In a data collection process, a method for processing management data, the method comprising:

receiving a current management data set containing current portions of management data collected from at least one managed resource in a network, the current management data set including at least one verification value;

using the at least one verification value, identifying current portions of management data in the current management data that reflect a change as compared to management data in managed objects obtained from a former management data set previously collected from the managed resource and stored within a management database; and for any current portions of management data in the current management data that reflect a change in comparison to management data in managed objects in the management database, modifying the managed object data in the management database operating in a computer system with portions of management data from the current management data set to reflect any identified differences from the current management data set;

wherein receiving a current management data set comprises:

performing verification of receipt of the current management data set by verifying a total verification value calculated on the current management data set;

obtaining an identity of at least one managed object associated with the current management data set; and obtaining at least one management lock on managed object data corresponding to the identity of at least one managed object.

11. The method of claim 10 comprising:

obtaining, from the management database, a former total verification value associated with former management data stored in the management database that corresponds with the identity of at least one managed object associated with the current management data set; and comparing the former total verification value to a former total verification value appended to the received current management data set; and if the former total verifications values are the same, then performing a change-only update to update former management data, in the management database that correspond to and that are different from current portions of management data in the current management data set, with those corresponding and different current portions of management data from the current management data set.

12. The method of claim 11 wherein performing a change-only update comprises:

for each current portion of management data in the current management data set:

i) replacing a former portion of management data with a corresponding current portion of management data that is identified as containing a change and that has an associated current index verification value that matches a former index verification value corresponding to the former portion of management data;

ii) marking for deletion a former portion of management data in the at least one managed object when the current management data set contains a deletion marker associated with a former verification value corresponding to that former portion of management data; and iii) adding any current management data portions of the current management data set that are identified as new current data portions as management data portions to be added to the at least one managed object.

13. The method of claim 12 comprising:
if the former total verification values are not the same, then performing a complete update of management data stored within all managed objects of the management database that correspond to portions of management data in the current management data set with those corresponding portions of management data from the current management data set.

14. The method of claim 13 wherein performing a complete update of management data stored within all managed objects of the management database that correspond to portions of management data in the current management data set comprises:
   obtaining at least one managed object from the management database that corresponds to the current management data set;
   identifying each current portion of management data in the current management data set that corresponds with a former potion of management data in the at least one managed object obtained from the management database, and in response:
      i) replacing the former portion of management data in the at least one managed object with the identified corresponding current portion of management data;
      ii) indicating the identified corresponding current portion of management data as having replaced a former portion of management data in the at least one managed object; and
      iii) indicating the former portion of management data in the at least one managed object as having been replaced by the current portion of management data.

15. The method of claim 14 comprising:
   for any former portions of management data of the at least one managed object that are not indicated as having been replaced by identified corresponding current portions of management data, removing those former portions of management data from the at least one managed object; and
   for any current portions of management data that are not indicated as having replaced a former portion of management data in the at least one managed object, adding those current portions of management data from the current management data set to the at least one managed object.

16. The method of claim 15 comprising:
   after at least one of performing a change-only update and performing a complete update:
   committing, to the management database, management data associated with the at least one managed object for which the at least one management lock was obtained;
   storing the at least one verification value of the current management data set for use as an at least one former verification value when receiving a subsequent management data set collected from at least one managed resource in a network; and
   releasing the at least one management lock on managed object data.

17. The method of claim 10 wherein identifying current portions of management data in the current management data that reflect a change as compared to management data in managed objects obtained from a former management data set comprises:
   identifying less than all current management data portions in the current management data set as reflecting a change; and
   wherein modifying the managed object data in the management database with portions of management data from the current management data set comprises:
   modifying less than all managed object data within managed objects that corresponding to all management data portions contained in the current management data set.

18. The method of claim 10 wherein:
   the data collection process is a storage process operating as part of a storage area network management application and wherein the verification values are checksum values.

19. A computer system comprising:
   a memory;
   a processor;
   a communications interface;
   an interconnection mechanism coupling the memory, the processor and the communications interface;
   wherein the memory is encoded with an agent application that when performed on the processor, provides an agent for processing management information, the agent configuring the computer system for:
   collecting a current management data set from at least one managed resource in a network;
   comparing the current management data set to a former management data set previously collected from the managed resource in the network to identify differences in the current management data set as compared to the former management data set;
   appending at least one verification value to the current management data set to allow remote verification of contents of the current management data set; and
   transmitting, via the communications interface, the current management data set to a remote location for storage within a management database for access by a network management application operating in a respective computer system;
   wherein when the agent performs comparing the current management data set to a former management data set, the agent performs:
   calculating a current verification value on a current portion of management data in the current management data set;
   comparing the current verification value to a former verification value of a former portion of management data in the former management data set that corresponds to the current data portion of the current management data set; and
   determining if the current verification value is not equal to the former verification value, and if so, identifying the current portion of management data in the current management data set as containing a chance in relation to the corresponding former portion of management data.

20. The computer system of claim 19 wherein determining if the current verification value is not equal to the former verification value includes:
   determining if the current verification value is equal to the former verification value, and if so, identifying the former verification value as being considered for change.

21. The computer system of claim 20 wherein the agent configures the computer system for:
   repeating the steps of:
      i) calculating a current verification value;
      ii) comparing the current verification value; and
      iii) determining if the if the current verification value is or is not equal to the former verification value;

for a plurality of current and corresponding former portions of management data in the current and former management data sets, respectively, such that all current portions of management data to which the repeating applies and that differ from former portions of management data are identified within the current management data set.

22. The computer system of claim 21 wherein the agent cofigures the computer system for:
after all current portions of management data that differ from former portions of management data are identified within the current management data set, identifying any former verification values that are not identified as considered for change;
for each identified former verification value that is not identified as considered for change:
adding that former verification value to the current management data set; and
associating a deletion marker to that former verification value to indicate that a former data portion in the former management data set corresponding to that former verification value no longer exists in the current management data set.

23. The computer system of claim 21 wherein the agent configures the computer system for:
calculating a current index verification value on current index data that indexes the current portions of management data in the current management data set;
comparing the current index verification value to an index map of former index verification values associated with former index data that indexes former portions of the management data in the former management data set; and
if the current index verification value maps to the former index verification value, then:
obtaining a former data portion verification value from a former data portion in the former management data set that corresponds to the former index verification value;
calculating a current data portion verification value on fields of the current portion in the current management data set that corresponds to the current index verification value; and
comparing the current data portion verification value to the former data portion verification value and if the current data portion verification value is not equal to the former data portion verification value, identifying the current data portion corresponding to the current index verification value in the current management data set as containing a change.

24. The computer system of claim 23 wherein the agent configures the computer system for:
if the current index verification value does not map to a former index verification value in the index map, then:
identifying the current data portion that corresponds to the current index data as being a new current data portion of current management data in the current management data set; and
calculating a current data portion verification value on the new current data portion of current management data in the current management data set; and
appending the current data portion verification value calculated on the new current data portion of current management data to the current management data set.

25. The computer system of claim 19 wherein the agent configures the computer system for:
calculating a total verification value on the current management data set;
appending the total verification value onto the current management data set;
appending a former verification value onto the current management data set; and
storing the total verification value for future access as a new former verification value.

26. The computer system of claim 25 wherein the agent configures the computer system for:
receiving an acknowledgement from the remote location that accepts the current management data set as valid; and
in response to receiving the indication, storing at least a portion of the current management data set including verification values associated with the current management data set for future access as a new former management data set.

27. The computer system of claim 26 wherein:
the agent collects data for a storage area network management application;
the current index data is a database key that identifies a corresponding current data portion in a management database and wherein the index verification value is a checksum value calculated on the database key; and
the current data portion verification value is a checksum value calculated on the current data portion that is database data in the management database corresponding to the database key.

28. A computer system comprising:
a memory;
a processor;
a communications interface;
an interconnection mechanism coupling the memory, the processor and the communications interface;
wherein the memory is encoded with an store application that when performed on the processor, configures the computer system for:
receiving, via the communications interface, a current management data set containing current portions of management data collected from at least one managed resource in a network, the current management data set including at least one verification value;
using the at least one verification value, identifying current portions of management data in the current management data that reflect a change as compared to management data in managed objects obtained from a former management data set previously collected from the managed resource and stored within a management database coupled to the computer system; and
for any current portions of management data in the current management data that reflect a change in comparison to management data in managed objects in the management database, modifying the managed object data in the management database with portions of management data from the current management data set to reflect any identified differences from the current management data set;
wherein when the computer system is configured for:
receiving a current management data set;
performing verification of proper receipt of the current management data set by verifying a total verification value calculated on the current management data set;
obtaining an identity of at least one managed object associated with the current management data set; and obtaining at least one management lock on managed object data corresponding to the identity of at least one managed object associated with current management data set.

29. The computer system of claim 28 wherein the computer system is configured for:

obtaining, from the management database, a former total verification value associated with former management data stored in the management database that corresponds with the identity of at least one managed object associated with the current management data set; and comparing the former total verification value to a former total verification value appended to the received current management data set; and if the former total verifications values are the same, then performing a change-only update to update former management data, in the management database that correspond to and that are different from current portions of management data in the current management data set, with those corresponding and different current portions of management data from the current management data set.

30. The computer system of claim 29 wherein the computer system is configured for:

for each current portion of management data in the current management data set:

i) replacing a former portion of management data with a corresponding current portion of management data that is identified as containing a change and that has an associated current index verification value that matches a former index verification value corresponding to the former portion of management data;

ii) marking for deletion a former portion of management data in the at least one managed object when the current management data set contains a deletion marker associated with a former verification value corresponding to that former portion of management data; and iii) adding any current management data portions of the current management data set that are identified as new current data portions as management data portions to be added to the at least one managed object.

31. The computer system of claim 30 wherein the computer system is configured for:

if the former total verification values are not the same, then performing a complete update of management data stored within all managed objects of the management database that correspond to portions of management data in the current management data set with those corresponding portions of management data from the current management data set.

32. The computer system of claim 31 wherein when the computer system completes updating of management data stored within all managed objects of the management database that correspond to portions of management data in the current management data set, the computer system supports:

obtaining at least one managed object from the management database that corresponds to the current management data set;

identifying each current portion of management data in the current management data set that corresponds with a former potion of management data in the at least one managed object obtained from the management database, and in response:

i) replacing the former portion of management data in the at least one managed object with the identified corresponding current portion of management data;

ii) indicating the identified corresponding current portion of management data as having replaced a former portion of management data in the at least one managed object; and iii) indicating the former portion of management data in the at least one managed object as having been replaced by the current portion of management data.

33. The computer system of claim 32 wherein the computer system is configured for:

for any former portions of management data of the at least one managed object that are not indicated as having been replaced by identified corresponding current portions of management data, removing those former portions of management data from the at least one managed object; and for any current portions of management data that are not indicated as having replaced a former portion of management data in the at least one managed object, adding those current portions of management data from the current management data set to the at least one managed object.

34. The method of claim 33 wherein the computer system is configured for:

after at least one of performing a change-only update and performing a complete update:

committing, to the management database, management data associated with the at least one managed object for which the at least one management lock was obtained;

storing the at least one verification value of the current management data set for use as an at least one former verification value when receiving a subsequent management data set collected from at least one managed resource in a network; and releasing the at least one management lock on managed object data.

35. The computer system of claim 28 wherein when the computer system identifies current portions of management data in the current management data that reflect a change as compared to management data in managed objects obtained from a former management data set, the computer system configured for identifying less than all current management data portions in the current management data set as reflecting a change; and wherein modifying the managed object data in the management database with portions of management data from the current management data set comprises:

modifying less than all managed object data within managed objects that corresponding to all management data portions contained in the current management data set.

36. The computer system of claim 28 wherein:

the computer system is configured to perform data collection as part of a storage area network management application and wherein the verification values are checksum values.

37. A computer system comprising:

a memory;

a processor;

a communications interface;

an interconnection mechanism coupling the memory, the processor and the communications interface;

wherein the memory is encoded with an agent application that when performed on the processor, provides an agent for processing management information, the agent configuring the computer system to:

collect a current management data set from at least one managed resource in a network;

compare the current management data set to a former management data set previously collected from the managed resource in the network to identify differences in the current management data set as compared to the former management data set;

append at least one verification value to the current management data set to allow remote verification of contents of the current management data set; and transmit, via the communications interface, the current management data set to a remote location for storage within a management database for access by a network management application;

wherein compare the current management data set to a former management data set comprises:

calculate a current verification value on a current portion of management data in the current management data set;

compare the current verification value to a former verification value of a former portion of management data in the former management data set that corresponds to the current data portion of the current management data set; and determine if the current verification value is not equal to the former verification value, and if so, identifying the current portion of management data in the current management data set as containing a change in relation to the corresponding former portion of management data.

38. A computer system comprising:
a memory;
a processor;
a communications interface;
an interconnection mechanism coupling the memory, the processor and the communications interface;
wherein the memory is encoded with an store application that when performed on the processor, configures causing the computer system to:

receive, via the communications interface, a current management data set containing current portions of management data collected from at least one managed resource in a network, the current management data set including at least one verification value;

use the at least one verification value, identifying current portions of management data in the current management data that reflect a change as compared to management data in managed objects obtained from a former management data set previously collected from the managed resource and stored within a management database coupled to the computer system; and for any current portions of management data in the current management data that reflect a change in comparison to management data in managed objects in the management database, modify the managed object data in the management database with portions of management data from the current management data set to reflect any identified differences from the current management data set;

wherein receive a current management data set comprises:
perform verification of receipt of the current management data set by verifying a total verification value calculated on the current management data set;

obtain an identity of at least one managed object associated with the current management data set; and obtain at least one management lock on managed object data corresponding to the identity of at least one managed object.

39. A computer program product having a computer-readable storage medium including computer program logic encoded thereon that, when executed on a computer system provides a method for processing management information by causing the computer system to:

collect a current management data set from at least one managed resource in a network;

compare the current management data set to a former management data set previously collected from the managed resource in the network to identify differences in the current management data set as compared to the former management data set;

append at least one verification value to the current management data set to allow remote verification of contents of the current management data set; and transmit the current management data set to a remote location for storage within a management database for access by a network management application;

wherein compare the current management data set to a former management data set comprises:

calculate a current verification value on a current portion of management data in the current management data set;

compare the current verification value to a former verification value of a former portion of management data in the former management data set that corresponds to the current data portion of the current management data set; and determine if the current verification value is not equal to the former verification value, and if so, identifying the current portion of management data in the current management data set as containing a change in relation to the corresponding former portion of management data.

40. A computer program product having a computer-readable storage medium including computer program logic encoded thereon that, when executed on a computer system provides a method for processing management information by causing the computer system to:

receive a current management data set containing current portions of management data collected from at least one managed resource in a network, the current management data set including at least one verification value;

use the at least one verification value, identifying current portions of management data in the current management data that reflect a change as compared to management data in managed objects obtained from a former management data set previously collected from the managed resource and stored within a management database; and for any current portions of management data in the current management data that reflect a change in comparison to management data in managed objects in the management database, modify the managed object data in the management database with portions of management data from the current management data set to reflect any identified differences from the current management data set;

wherein receive a current management data set comprises:
perform verification of receipt of the current management data set by verifying a total verification value calculated on the current management data set;

obtain an identity of at least one managed object associated with the current management data set; and obtain at least one management lock on managed object data corresponding to the identity of at least one managed object.

41. A data management system for collecting and processing management data for storage within a management database, the system comprising:

an host computer system configured for:

comparing the current management data set from at least one managed resource in a network;

comparing the current management data set to a former management data set previously collected from the managed resource in the network to identify differences in the current management data set as compared to the former management data set;

appending at least one verification value to the current management data set to allow remote verification of contents of the current management data set; and transmitting the current management data set to a location for storage within the management database for access by a network management application;

a storage computer system in communication with the host computer system and coupled to the management database, the storage computer system configured for:

receiving, from the agent on the host computer system, the current management data set containing current portions of management data collected from at least one managed resource in a network, the current management data set including at least one verification value;

using the at least one verification value, identifying current portions of management data in the current management data that reflect a change as compared to management data in managed objects obtained from a former management data set previously collected from the managed resource and stored within a management database; and for any current portions of management data in the current management data that reflect a change in comparison to management data in managed objects in the management database, modifying the managed object data in the management database with portions of management data from the current management data set to reflect any identified differences from the current management data set.

* * * * *